US007818811B2

(12) United States Patent
Kirovski et al.

(10) Patent No.: US 7,818,811 B2
(45) Date of Patent: Oct. 19, 2010

(54) OFF-LINE ECONOMIES FOR DIGITAL MEDIA

(75) Inventors: Darko Kirovski, Kirkland, WA (US); Kamal Jain, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 418 days.

(21) Appl. No.: 11/296,194

(22) Filed: Dec. 6, 2005

(65) Prior Publication Data

US 2007/0136608 A1 Jun. 14, 2007

Related U.S. Application Data

(60) Provisional application No. 60/742,703, filed on Dec. 5, 2005.

(51) Int. Cl.
G06F 7/04 (2006.01)
G06F 21/00 (2006.01)
H04L 9/32 (2006.01)
H04N 7/16 (2006.01)

(52) U.S. Cl. ............. 726/26; 713/176; 726/27; 726/28; 726/29; 705/52; 705/53; 705/59

(58) Field of Classification Search ........... 705/52, 705/53, 59; 726/26
See application file for complete search history.

(56) References Cited

U.S. PATENT DOCUMENTS

| 4,789,863 | A | * | 12/1988 | Bush | 340/5.9 |
|---|---|---|---|---|---|
| 4,811,325 | A | * | 3/1989 | Sharples et al. | 369/85 |
| 5,440,634 | A | | 8/1995 | Jones et al. | |
| 6,282,653 | B1 | * | 8/2001 | Berstis et al. | 726/26 |
| 6,470,085 | B1 | * | 10/2002 | Uranaka et al. | 380/231 |
| 6,594,692 | B1 | * | 7/2003 | Reisman | 709/219 |
| 6,718,314 | B2 | | 4/2004 | Chaum et al. | |
| 6,915,425 | B2 | * | 7/2005 | Xu et al. | 713/165 |
| 6,950,867 | B1 | * | 9/2005 | Strohwig et al. | 709/224 |
| 7,191,155 | B2 | | 3/2007 | Maruyama et al. | |
| 7,249,107 | B2 | * | 7/2007 | Yaacovi | 705/59 |
| 7,287,078 | B2 | * | 10/2007 | Pradhan et al. | 709/225 |
| 2001/0037311 | A1 | * | 11/2001 | McCoy et al. | 705/65 |
| 2002/0123937 | A1 | * | 9/2002 | Pickover et al. | 705/26 |

(Continued)

OTHER PUBLICATIONS

T. Dierks, C. Allen, The TLS Protocol: Version 1.0, Network Working Group, Internet Engineering Task Force (IETF), Jan. 1999, pp. 1-80.*

(Continued)

*Primary Examiner*—Matthew T Henning
(74) *Attorney, Agent, or Firm*—Lee & Hayes, PLLC

(57) ABSTRACT

An off-line economy for digital media. In one implementation, exemplary media devices of buyer and seller participate in the off-line economy by performing secure off-line transfers of digital media content between themselves. The media devices store proof of the off-line sales transactions, so that a percentage of the sale price can be applied to a copyright owner and a percentage of the sale price can be applied to the seller as an incentive. Even resale of pirated media content benefits the copyright holder. The off-line economy opens an effective and inexpensive distribution channel for copyright holders and allows buyers to obtain media content anywhere, at any time, from any participant in the off-line economy without connecting to the Internet. The off-line economy allows copyright holders and media sellers to optimize pricing by market probing.

22 Claims, 10 Drawing Sheets

U.S. PATENT DOCUMENTS

| | | | | |
|---|---|---|---|---|
| 2003/0222138 | A1* | 12/2003 | Oppenlander et al. | 235/380 |
| 2003/0226012 | A1* | 12/2003 | Asokan et al. | 713/156 |
| 2004/0148229 | A1 | 7/2004 | Maxwell | |
| 2004/0172365 | A1* | 9/2004 | Murakami et al. | 705/52 |
| 2005/0192958 | A1* | 9/2005 | Widjojo et al. | 707/5 |
| 2005/0234860 | A1 | 10/2005 | Roever et al. | |
| 2006/0041561 | A1* | 2/2006 | Singer et al. | 707/10 |
| 2006/0143690 | A1 | 6/2006 | Lin et al. | |
| 2007/0073621 | A1 | 3/2007 | Dulin et al. | |
| 2007/0073845 | A1 | 3/2007 | Reisman | |

OTHER PUBLICATIONS www.digitalmusicnews.com/blog/114, Oct. 25, 2004, Digital Music News, retrieved from the Internet Archives on Jan. 3, 2004.*

P. Golle, K. Leyton-Brown, I. Mironov, M. Lillibridge, Incentives for Sharing in Peerto -Peer Networks, Proc. of the ACM Conference on Electronic Commerce, 2001.*

Androutsellis-Theotokis, S. and Spinellis, D. 2004. A survey of peer-to-peer content distribution technologies. ACM Comput. Surv. 36, (Dec. 4, 2004), 335-371.*

Shuman Ghosemajumder. Advanced Peer-Based Technology Business Models. MIT Sloan School of Management, 2002, pp. 1-58.*

Shuman Ghosemajumder. The Open Music Model, Shuman Ghosemajumder, 2003, pp. 1-4; accessed at http://shumans.com/openmusicmodel.pdf on Jan. 3, 2008.*

Weedshare; Weed FAQ; May 8, 2004.*

"FluidMedia: an offline peer-to-peer media transaction system," Hewlett-Packard Technical Reports, HPL-2002-342, Dec. 12, 2002, pp. 1-6.*

"DRM Architecture", at <<htp://www.openmobilealliance.org/release_program/docs/DRM/V2_0-20060303-A/OMA-AD-DRM-V2_0-20060303-A.pdf>>, Open Mobile Alliance Ltd., 2006, pp. 24.

Gouguenheim, et al., "Using Financial Incentives to Enable Legal Media Distribution in Ad-Hoc Peer-to-Peer Networks: An Introduction to FluidMedia", at <<http://www.hpl.hp.co.uk/techreports/2004/HPL-2004-15.pdf>>, Hewlett-Packard Company, 2004, pp. 11.

Kirovski et al., "Offline Economies for Digital Media", at <<http://research.microsoft.com/users/darkok/papers/nossdav.pdf>>, ACM, 2006, pp. 6.

* cited by examiner

OFF-LINE ECONOMIES FOR DIGITAL MEDIA

RELATED APPLICATIONS

The present application claims priority to U.S. Provisional Patent Application, application Ser. No. 60/742,703 to Kirovski et al., entitled, "Distributed Off-line Economies for Digital Media," filed Dec. 5, 2005.

BACKGROUND

The proliferation of multi-functional portable devices has impacted the way digital media is marketed and played. The impact has been so great that lawmakers have begun to question traditional copyright laws, meant for an earlier age when content to be protected was bound to material artifacts and not instantly reproducible—and distributable—as pure digital information. Considering the size of the music market alone, estimated at around $12 billion in the U.S., there have been surprisingly few solutions that uniquely address the distribution economics of digital media.

As shown in FIG. 1, most, if not all, economic ecosystems for digital media are based upon on-line systems 100 that market, recommend, sell, and store each media clip into a user's personal computer or portable media player, via the Internet 102. A popular example of such a system is APPLE'S combination of an online store 104, ITUNES, with a media player device, the IPOD 106 (Apple Computer, Inc., Cupertino, Calif.). Typically, a digital rights management (DRM) system is used to protect the rights of the media content's copyright holder 108 by encrypting the media with a secret key 110 securely stored into the media player. Such systems 100 suffer from the exposure of the secret key 110. Once revealed, the key 110 can be used to arbitrarily edit the DRM information. In addition, the "analog hole" problem has plagued DRM systems. Once decrypted (into human-intelligible form) and played, the media content can be captured in its "plaintext" (non-encrypted) format, re-recorded, and distributed at will, thereby losing its previous protection.

These two problems, compromise of the secret key 110/DRM information, and re-capture of the raw analog version of the content as re-distributable media, have driven copyright holders 108 to seek their revenue on-line—primarily via client-server architectures, where the majority of the marketing, storage, and processing burden is imposed upon the servers while limiting customers to purchasing clips only when they are connected to the Internet 102.

As shown in FIG. 2, the on-line economic platform just described does not address the widespread phenomenon of file sharing 200, in which a dubious file sharing service 202 hosting convenient search mechanisms and enormous media availability does not support the possibility of selling/purchasing content for the benefit of the copyright holder 108. In most file-sharing platforms 200, content distribution is economically isolated from copyright holders 108.

SUMMARY

Systems and methods are described for an off-line economy for digital media. In one implementation, exemplary media devices of buyer and seller participate in the off-line economy by performing secure off-line transfers of digital media content between themselves. The media devices store proof of the off-line sales transactions, so that a percentage of the sale price can be applied to a copyright owner and a percentage of the sale price can be applied to the seller as an incentive. Even resale of pirated media content benefits the copyright holder. The off-line economy opens an effective and inexpensive distribution channel for copyright holders and allows buyers to obtain media content anywhere, at any time, from any participant in the off-line economy without connecting to the Internet. The off-line economy allows copyright holders and media sellers to optimize pricing by market probing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Figure 1:
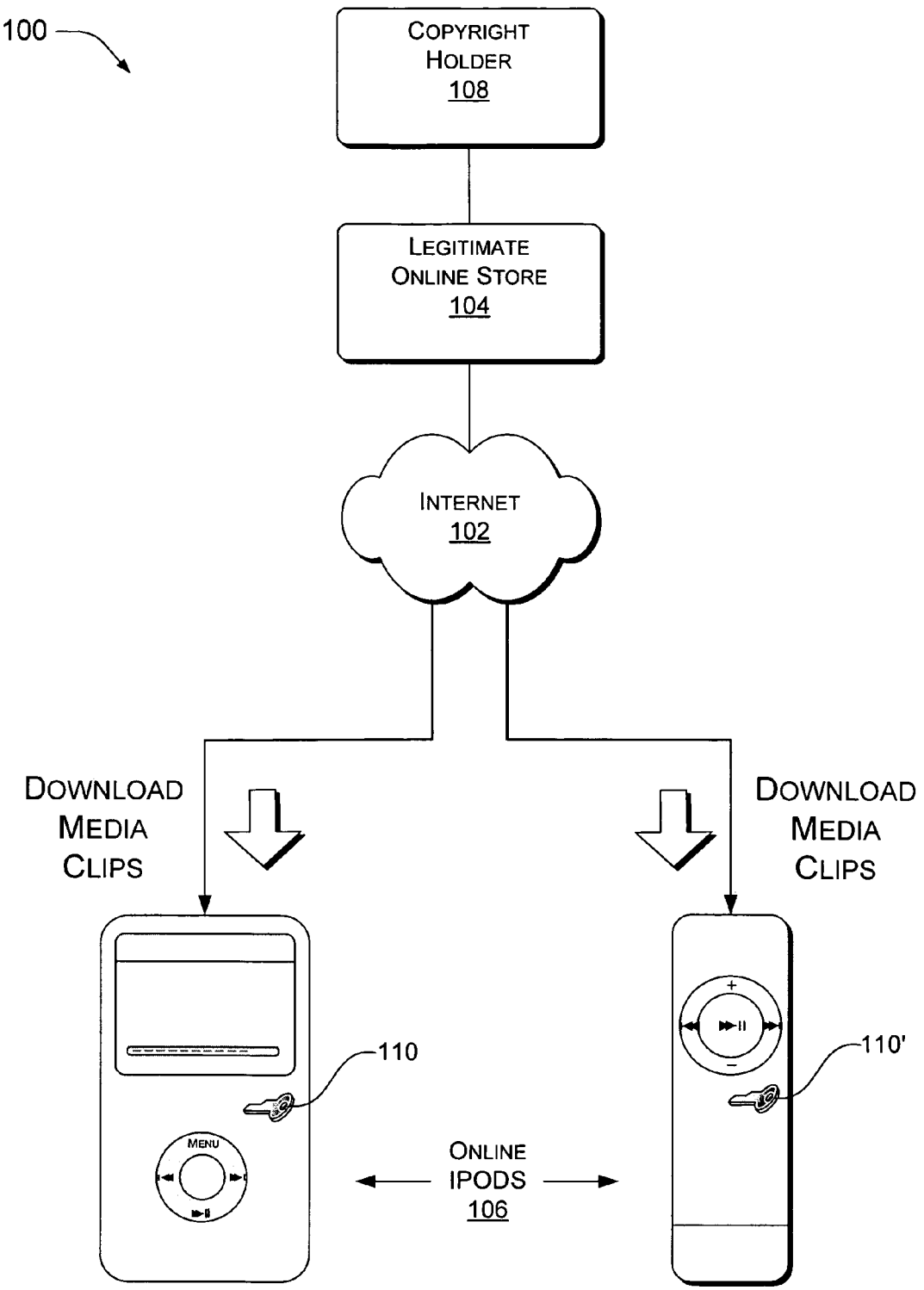
FIG. 1 is a diagram of a conventional schema for downloading media content on-line.
Figure 2:
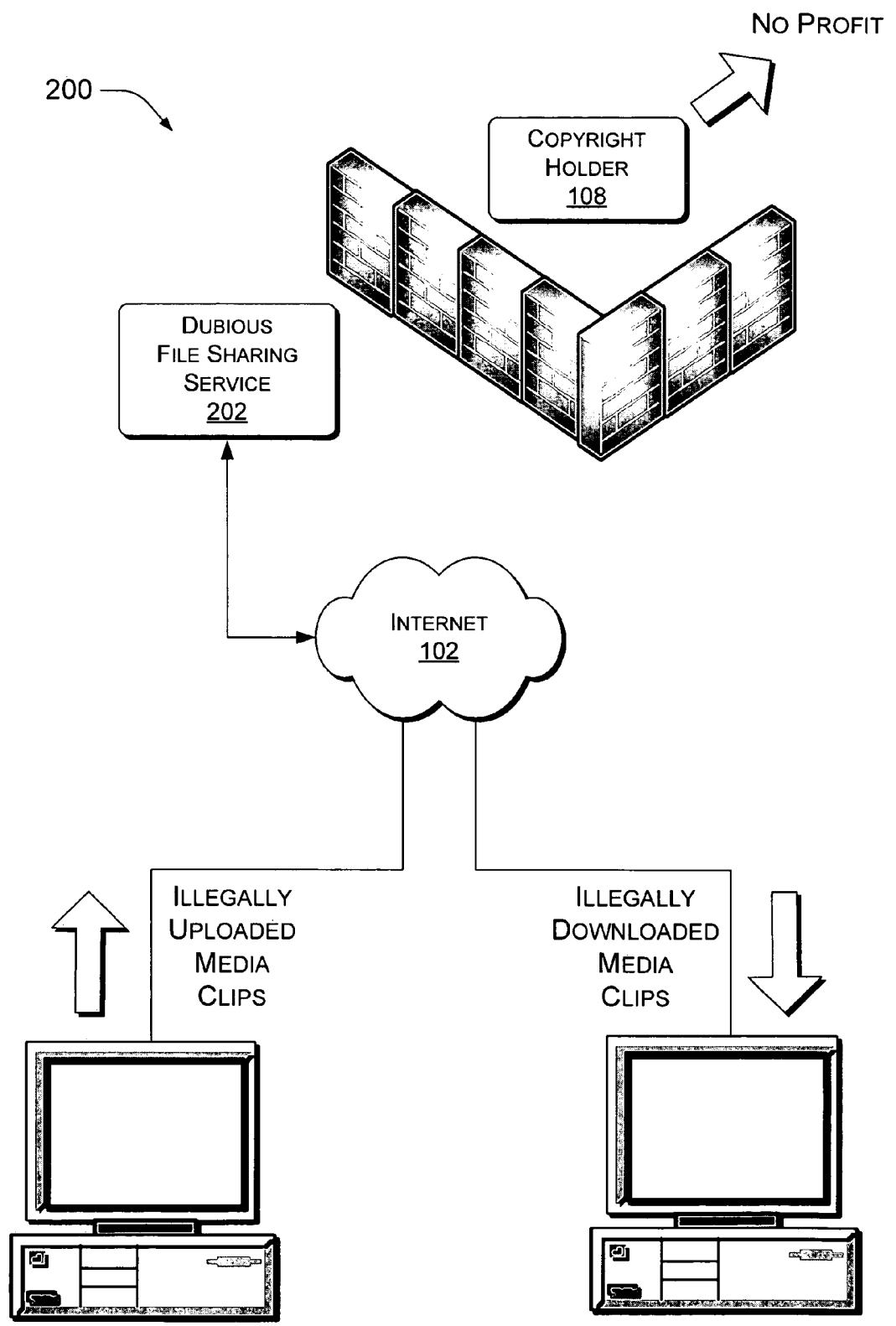
FIG. 2 is a diagram of a conventional on-line multimedia file-sharing system.
Figure 3:
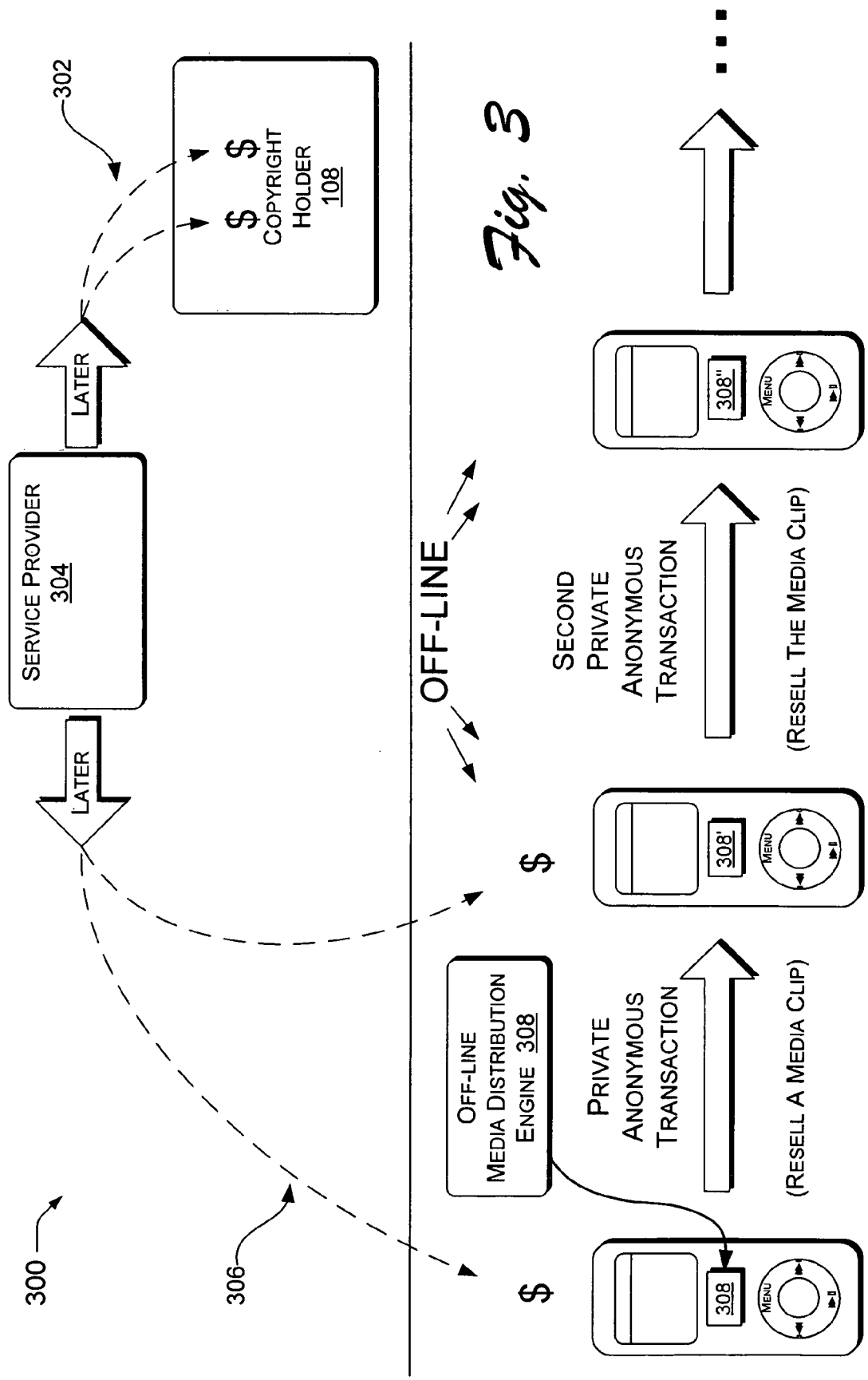
FIG. 3 is a diagram of exemplary off-line media distribution transactions.

As shown in FIG. 3, this disclosure describes an off-line economic platform 300 driven by free trade that enables off-line marketing and off-line distribution of media content. In the off-line economic platform 300, owners of media content, that is, users or customers "on the street," can resell their purchased—or even pirated—media content, such as a song clip, to others such that revenues are controlled by the copyright holder 108, i.e., a designated amount of the revenue 302 is automatically applied to the copyright holder 108, e.g., through a service provider 304. Another designated part of the revenue 306 is retained by the off-line seller, as an incentive for participating in the distributed off-line economy 300.

The term "off-line" is used herein to mean that the "transfer-of-goods" part of each transaction occurs between seller and buyer in a peer-to-peer manner, that does not require connection to the Internet 102 or other communication link to the world outside the seller and buyer. Although the Internet 102 can be used as the communication channel for transferring goods between such a seller and a buyer, it is not required. Thus, "off-line" means that, as to the transfer of goods (in this case digital media content), no communication link(s) besides that between seller and buyer are required. Thus, an MP3 player that can upload media content to another MP3 player via a Bluetooth connection can participate in the off-line digital economy 300. In one implementation, the transaction between an off-line seller and buyer is sent to a service provider 304 at some later time. The service provider 304 then acts as a clearinghouse for the monetary accounts of seller, buyer, and copyright holder 108, and credits or debits each account accordingly. Other implementations may use e-cash—electronic currency—thus keeping more aspects of the transaction off-line, and rendering to the service provider 304 a modified role.

Technologically, devices that play media and communicate with each other can be readily created, for example, by adding Bluetooth capability to an IPOD. To create a device that can securely participate in the off-line economy 300, however, an exemplary off-line media distribution engine 308 can be used in each device. The off-line media distribution engine 308 meets several challenges with regard to implementing an off-line economy 300 for digital media. First, the off-line media distribution engine 308 enforces transaction integrity via a cryptographic protocol. Second, implementations of the off-line media distribution engine 308 are built to reflect the fact that user incentives drive the off-line economy 300.

The distributed off-line economy 300 itself includes different economic strategies and trade-offs that can benefit both copyright holders 108 and consumers. Compared to existing on-line digital media stores 104, the exemplary off-line economic platform 300 establishes an important balance: copyright holders 108 can recruit a powerful marketing and sales force with marginal investment and via various types of incentives; users are offered the ability to sell to make a profit or purchase content they like anywhere, anytime, and to/from anyone. In other words, instead of having to connect to a single central source and perform various formalisms to buy a media clip—process that almost begs for competition from black market and gray market entrepreneurs—the exemplary off-line economy 300 described herein grants an incentive (e.g., money) to anyone and everyone who wants to distribute media content, perhaps especially those who would have distributed the content illegally anyway. By drawing even pirates into the market, the off-line economic model 300 presented herein redirects even unauthorized distribution of media content to profitable revenue for the copyright holder 108. That is, a media pirate is likely to participate legally in the exemplary off-line economy 300 rather than illegally outside the off-line economy 300, if the pirate can make approximately the same amount of money either way.

Figure 4:
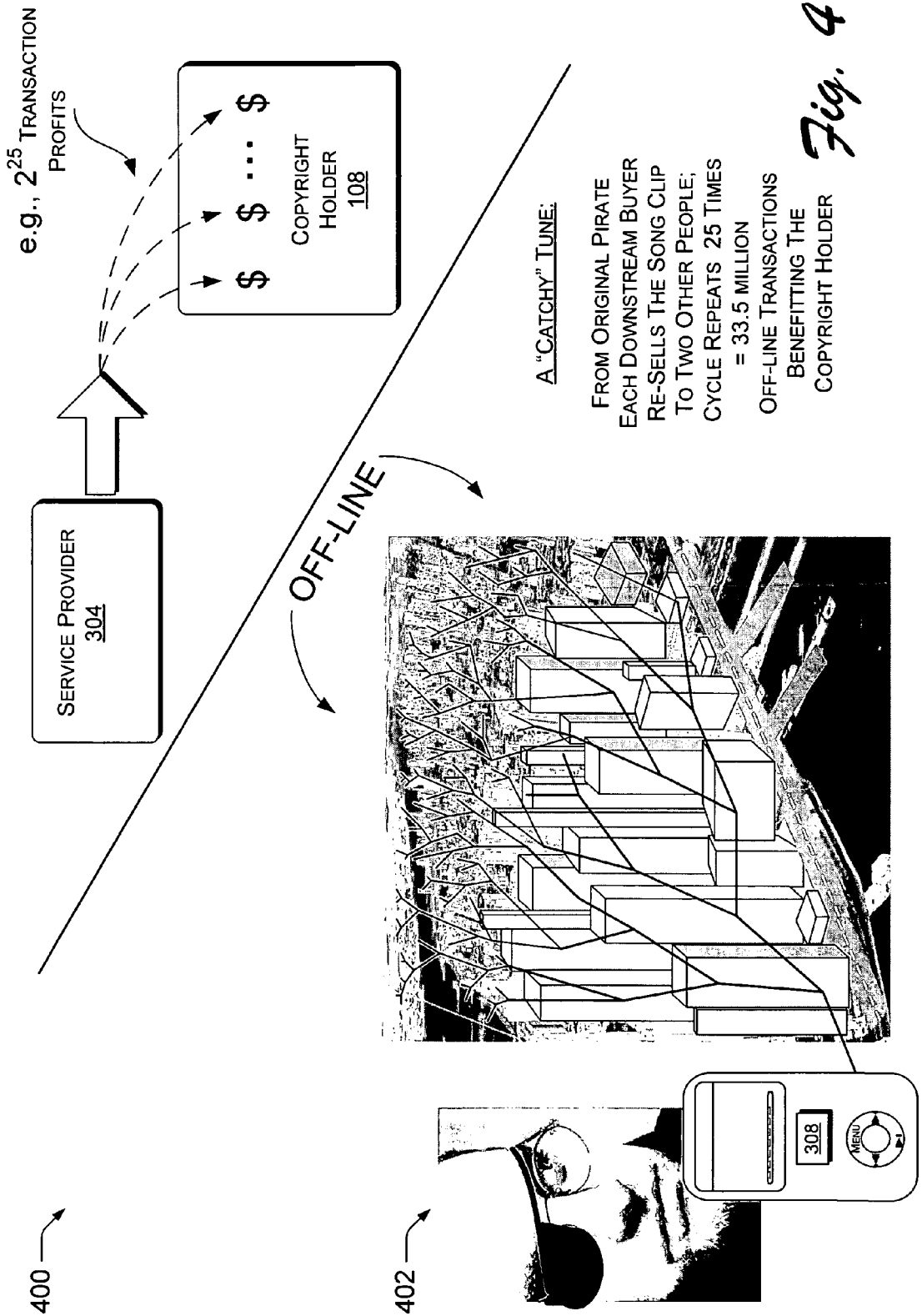
FIG. 4 is a diagram of an exemplary off-line media distribution scenario.

FIG. 4 shows an exemplary off-line distribution scenario 400 in which a user 402 obtains or creates a pirated song clip, and resells the song clip within the exemplary off-line economy 300. The first resale initiates further resale transactions. In this case, the song clip is a popular and catchy song clip, and each person who buys the song clip eventually resells the clip to two other people. By the time twenty-five buy/resale cycles have occurred, there have been over 33.5 million ($2^{25}$) off-line buyers, resulting in corresponding revenues (33.5 million times the copyright holder's percentage of each sale) for the copyright holder 108.

Figure 5:
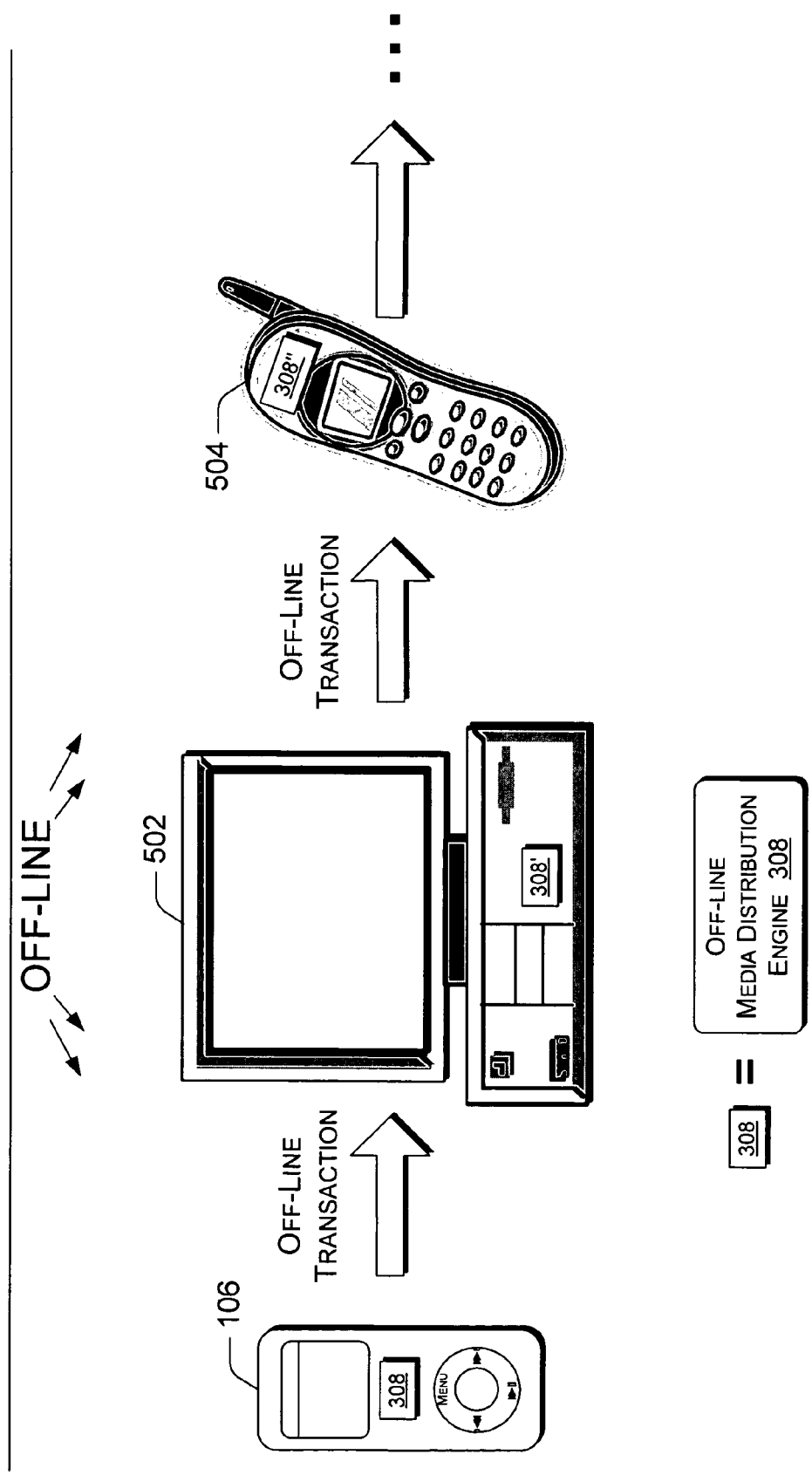
FIG. 5 is a diagram of exemplary media playing devices that each include an exemplary off-line media distribution engine.

FIG. 5 shows that many kinds of devices can participate in the exemplary off-line economy 300. For example, a media playing device, such as an MP3 player or an IPOD 106, can include an off-line media distribution engine 308 to securely participate in the off-line economy 300. Likewise, a personal computer 502 and a cell phone 504 can also include respective off-line media distribution engines (308', 308") to participate in the off-line economy 300. The buying and selling of digital media content is just one implementation of the off-line economy 300. With respective technology, other goods could be transacted via the off-line economy 300, such as analog media content or even non-media goods. However, the distributed off-line economy 300 is described below in terms of systems for distributing digital media content, such as digital recordings—of music, video, movies, etc.

Exemplary Off-line Economy For Digital Media

The exemplary distributed off-line economy 300 for digital media offers many advantages over conventional marketing schemata for digital media content. For example:

off-line sales—an owner of a copy of a particular digital content, which may even be obtained illegally, can sell the content to a third party without the immediate assistance of the copyright holder.

immediate purchase—pending a successful data transfer, the buyer can start playing the content immediately.

incentive-based sales—proceeds from the transaction are partitioned, for example, into two parts: one part can be assigned to the copyright holder 108 and another part can be credited to the participating sales-force; the incentives are credited towards the parties, e.g., once either seller's or buyer's device later establishes a connection to the service provider 304.

One aim of the off-line economic platform 300 is to enable selling digital content by anyone, anywhere, at anytime—posing almost no restrictions to the network and business models that can be established within the platform. For example, client-server, peer-to-peer, or multi-hop wireless network topologies can all be used in the exemplary off-line economy 300.

One of the first incentive-based digital media economies was brought about by WEEDSHARE technology (Shared Media Licensing, Inc., Seattle, Wash.). In the WEED system, when a user purchases a media file, the transaction proceeds are shared, with the artist or copyright holder 108 receiving 50% of the price, Shared Media Licensing, Inc., receiving 15% for service and software maintenance costs, and the last three sellers in the chain of transactions receiving 20%, 10%, and 5%, respectively, of the sale price. All sales are executed on-line and all participants are interconnected to the WEEDSHARE servers during transactions.

Other types of incentive-based systems have been proposed for peer-to-peer systems with an emphasis on the free-rider problem, i.e., the existence of users that participate in sharing files only as consumers, not contributors, thereby increasing contributors' costs. Golle et al. proposed a system where users pay for downloads and get paid for uploads using a quantized micro-payment system or by distributing "points"-incentives to share files (P. Golle, K. Leyton-Brown, I. Mironov, and M. Lillibridge, "Incentives for sharing in peer-to-peer networks," *ACM Electronic Commerce*, pp. 75-87, 2001.) With both types of rewards, their incentive-based systems focus on file-sharing without addressing copyright holders' benefits. Another class of problems associated with solutions to thwart free-riders is whitewashing, i.e., non-contributing users creating new accounts under different pseudonyms to avoid penalties associated with free-riders.

Nearly all incentive-based peer-to-peer mechanisms are focused on limiting free-riders, who themselves are usually a consequence of the availability of free content on peer-to-peer systems. Free content has recently been greatly reduced in file-sharing systems due to legal action from copyright holders.

The exemplary off-line economy 300 aims at a different part of the content distribution spectrum where copyright holders 108 are not isolated economically from the distribution channels. The exemplary off-line economy 300 can sway users from peer-to-peer distribution that is divorced from the copyright holder 108 into another model using the convenience of immediate off-line transactions, which directly benefits both copyright holders 108 with improved inexpensive marketing and customers with media availability and economic participation in the distribution chain.

Since copyright holders 108 have the incentive to resell their content, they may engage in countless marketing strategies. The exemplary off-line economic platform 300 can support both push and pull marketing. Conventional approaches to push marketing are local and global broadcasts and multicasts, while conventional approaches to pull marketing are, for example, data searches in a network of storage systems.

In the exemplary off-line economy 300 for digital content, although the monetary transactions typically involve three parties or more, the act of selling and buying digital content is peer-to-peer. The exemplary off-line media distribution engine 308 enables the act of selling/buying digital media to be performed off-line with preservation of transaction integrity. While using a peer-to-peer transfer of goods, the exemplary off-line economy 300 can be implemented within many different types of conventional sales models, besides money or coupon payment for the media content. The off-line media distribution engine 308 can be used in the context of coupon redemption, gift certificate schemata, rewards programs, multi-tier sales schemata, script sales, bartering systems, loan paybacks, cross-licensing of media content and/or use, sales promotions, loss-leaders, charitable fundraising, etc. The off-line economic platform 300 can also enable sophisticated forms of trade such as market-basket, subscriptions, auctions, trade-for-fee, and multi-party or multi-item discounts. The off-line economic platform 300 and the associated off-line media distribution engine 308 are not tied to any particular transaction model, but can be used in the context of many transactions or activities in which there is a transfer of goods, the goods in this case being media content. Finally, in one implementation, the act of committing a transaction can be based on a client-server architecture.

In one implementation, the proceeds of each trade are updated upon connecting the seller's or the buyer's portable media player to a global network such as the Internet 102 or a wireless access point. An efficient cryptographic protocol enforces integrity of payments even in the event of lack of trusted (tamper-proof) hardware.

Media player devices can be tampered with, i.e., it is safest to assume that all DRM secrets can be revealed and altered. As a consequence, media player devices will be able to share unprotected files with other media player devices outside of the exemplary off-line economic platform 300, in the same manner that existing conventional media playing devices can be commandeered and exploited. In the exemplary off-line economy 300, even with devices and/or DRM "broken," sellers, copyright holders 108, and buyers should not be able to claim benefits from transactions that did not occur and should not be able to alter the details of an actual transaction. Hence, in one implementation, the off-line economic platform 300 only needs to deploy "best-effort" anti-piracy mechanisms such as existing DRM technologies and tamper-resistant hardware, while relying on incentives for sellers to build the economy.

Stated a different way, if incentives are not significant, users are likely to participate in file sharing without the control of copyright holders 108. But for sufficient incentives, users are likely to drive sales for their own and the copyright holders' 108 economic benefit. To implement this off-line economy 300 based on incentives and the aforementioned tradeoffs, the off-line media distribution engine 308 introduced above, with its cryptographic protocol that enables off-line transactions, will now be described.

Exemplary Engine

Figure 6:
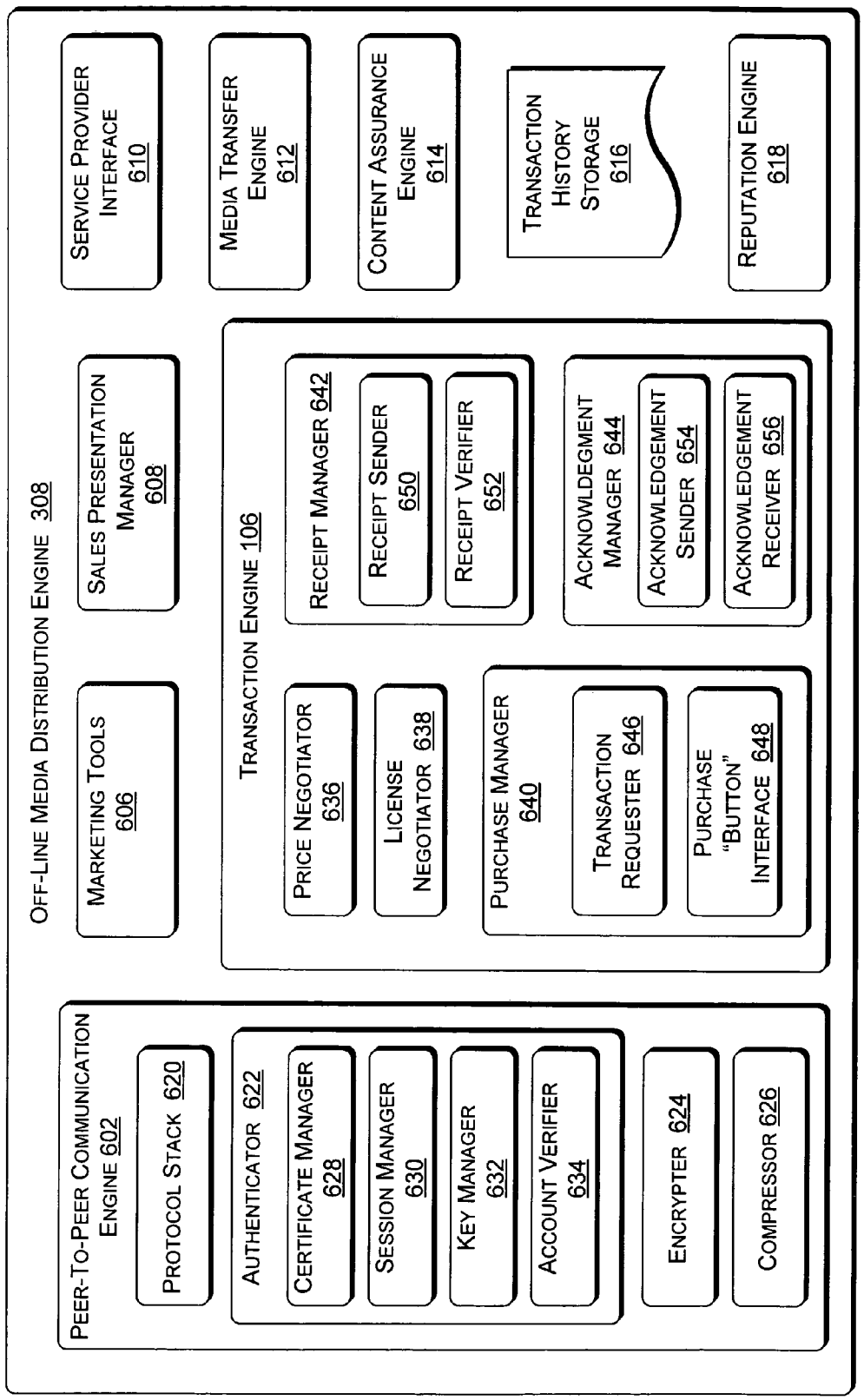
FIG. 6 is a block diagram of the exemplary off-line media distribution engine.

FIG. 6 shows the exemplary off-line media distribution engine 308 of FIGS. 3-5 in greater detail. The off-line media distribution engine 308 typically resides in a media-playing device, such as those shown in FIG. 5. The illustrated configuration of the exemplary off-line media distribution engine 308 is meant to provide only one example arrangement for the sake of description and overview. Many other arrangements of the illustrated components, or similar components, are possible within the scope of the subject matter. Such an exemplary off-line media distribution engine 308 can be executed in software, hardware, or combinations of hardware, software, firmware, etc.

In one implementation, the off-line media distribution engine 308 has a (peer-to-peer) communication engine 602 and a transaction engine 604. The communication engine 602 establishes off-line communication with a potential buyer or seller of digital media content. The transaction engine 604 performs the various stages of a media sale in a secure manner, within the context of the off-line economy 300. The off-line media distribution engine 308 may also include components such as marketing tools 606, a sales presentation manager 608, a service provider interface 610, a media transfer engine 612, a content assurance engine 614, transaction history storage 616, and a reputation engine 618. These will be discussed in greater detail, further below.

The communication engine 602 may further include a protocol stack 620, such as a Bluetooth stack; an authenticator 622, a data encrypter 624, and a data compressor 626. The authenticator 622 may further include a certificate manager 628, a session manager 630, a key manager 632, and an account verifier 634.

The transaction engine 604 may further include price and license negotiators (636 and 638), a purchase manager 640, a receipt manager 642, and an acknowledgement manager 644. The purchase manager 640 may further include a transaction requester 646 and a purchase "button" interface 648 to receive actuation signals from a physical purchase switch. The receipt manager 642 may further include a receipt sender 650 (used by the seller) and a receipt verifier 652 (used by the buyer). The acknowledgement manager 644 may further include an acknowledgement sender 654 (used by the buyer) and an acknowledgement receiver 656 (used by the seller).

Figure 7:
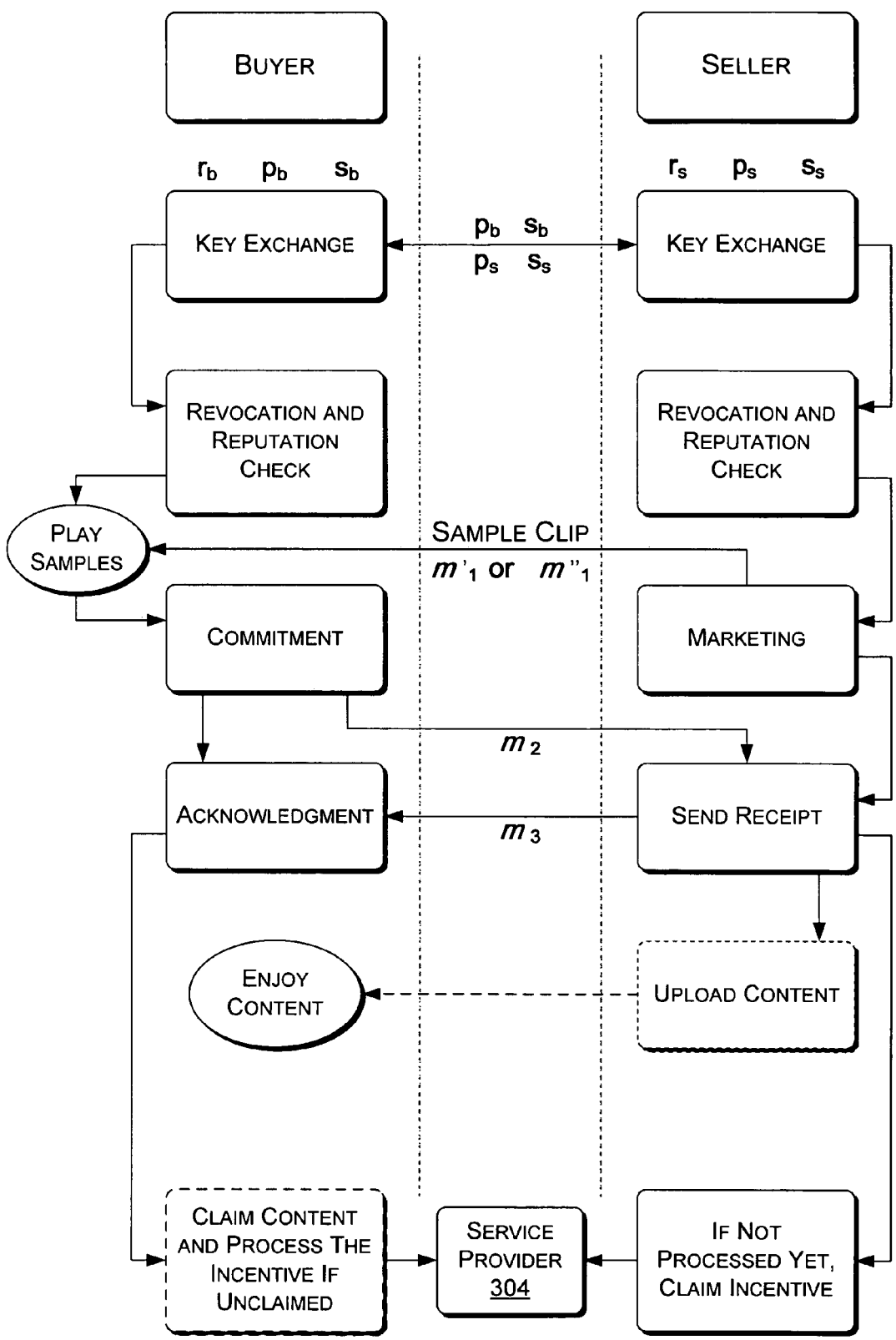
FIG. 7 is a flow diagram of an exemplary cryptographic protocol for the exemplary off-line economy.

As shown in FIG. 7, the exemplary off-line media distribution engine 308 shown in FIG. 6 implements a cryptographic protocol that enables an off-line transaction of digital content between two connected devices isolated from a global network such as the Internet 102. Four entities typically exist in an atomic off-line transaction: seller s, buyer b, service provider p, and trusted authority t. The service provider is contracted by copyright holders 108 to market and/or organize the sales of their digital content. The service provider p is responsible for realizing the payments in the off-line economy 300 and distributing incentives, e.g., via credit cards, accounts, or other forms of banking. Much like traditional e-commerce transactions, the trusted authority t issues a public-private key-pair to each entity including certificates that authenticate the distributed public keys. This information is used so that users can authenticate each other and prove identities when buying clips or redeeming credits for transactions made.

In one implementation, the off-line media distribution engine 308 uses RSA as a public-key cryptosystem, by following the IEEE 1363-2000 standard IFSP- and IFVP-RSA version 2. For a given participating entity x, its public-key & private-key pair can be denoted as $\{p_x, r_x\}$ respectively. In order to vouch for the authenticity of the public key, the certificate manager 628 of each entity (except the trusted authority t) possesses a certificate $c_x = \{p_x, s_x\}$, which contains the signature $S_{x,x} = SP_{r_t}(p_x)$ where function $SP_a(b)$ denotes RSA's signing primitive of message b using private key a. Certificates are verified by proving $p_x = VP_{p_t}(s_x)$, where function $VP_a(b)$ denotes RSA's verification primitive of signature b using the public key a. Just as in modem certificate verification protocols, the public key p, can be assumed known to all devices. Finally, the certificate manager 628 of each device contains a certificate of the service provider, $c_p = \{p_p, s_p = SP_{r_t}(p_p)\}$, upon enrolling in an off-line market service.

Characteristics of Exemplary Off-line Transactions

Each individual "atomic" transaction fulfills several objectives to overcome corresponding threat models. A basic premise is that either the buyer's or the seller's device is likely to be eventually connected to a global network, such as the Internet 102, at some time following an off-line transaction. This is one way that transactions are eventually committed with the service provider 304 so that the buyer is billed the price of the media content and the seller is credited with the corresponding incentive (e.g., a percentage of the sales price). In one implementation, to commit a transaction, it is sufficient that only one of the participants connects with the service provider 304.

In such an off-line economic platform 300, a main objective is to prevent manipulations that may benefit either of the entities in an unfair manner. This objective is now presented as a list of system characteristics for one implementation of the off-line media distribution engine 308:

Non-repudiation of executed transactions: a buyer should not be able to repudiate a transaction after which the buyer downloaded the digital content from the seller.

Mutual initiation: a seller should not be able to create an arbitrary transaction with a certain buyer unless the seller gains total unauthorized control over the buyer's media device either physically or via a software virus. In one implementation, the latter case can be prevented by demanding physical action to initiate a transaction, such as a "purchase" physical button that enables data transmission only when the button is actuated.

Limited damage in case of device loss: a lost media playing device (e.g., 106) should enable the party who finds it to realize only limited financial gain γ, defined by the user. Amount r equals the limit of purchasing power that a device may have between two synchronization events with the service provider.

Device revocation: when an adversary misappropriates a media playing device, the adversary can "break" its tamper-resistance, and edit the protection limit r continuously to take advantage of transactions that will be identified as fraudulent by the service provider 304 too late to be stopped. Then, after the adversary obtains digital content from the seller off-line, the seller later discovers that the transaction was fraudulent when the seller connects to the service provider 304. Such buyers are sometimes defined as "ghosts." To prevent this exploitation by ghosts, lost or misused devices can be identified, catalogued, and the resulting list can be distributed to all devices upon connection with service providers 304. Thus, an updated seller device should be able to verify the financial validity of the buyer before realizing a transaction (and vice versa).

Transaction integrity: both buyers and sellers should not be able to alter any of the information generated about committed transactions.

Robustness to communication failure: upon communication failure, a buyer or seller should not be able to enjoy the benefits of the transaction, without all details of the transaction being reflected. For example, a buyer could pay for a media clip and lose the communication connection during download. When connecting with the service provider 304, the buyer should be able to present a transaction receipt and resume the download.

Media piracy prevention via traditional methods: the off-line media distribution engine 308 should be able to protect copyright holders 108 from piracy via traditional DRM methods such as symmetric encryption and licenses. This vulnerability is seldom absent as encryption keys can be reverse engineered from players and decrypted content can be captured either digitally or using an analog recorder.

Penalizing clients who do not commit transactions: certain sellers may refuse to receive their sales credits in order to benefit their "buyers" with free content. That is, a user may decide to never connect the media device online to the service provider 304, or may "break" the media device and remove its history of non-committed transactions. In both cases, the user may be penalized by not being able to participate in the distributed off-line economy 300 and by having to invest time, effort, and funds into "breaking" the tamper-resistant media device. These additional direct and indirect costs incurred by the adversary are meant to offset the likelihood for content piracy that might be present because of a convenient wireless transfer between sharing devices.

Transferring sale proceeds to the lawful copyright holder 108: the off-line media distribution engine 308 should prevent an adversary from altering the DRM information of an existing digital content copyrighted by holder $h_1$ to point to holder $h_2$ ($\neq h_1$), and thereby sell the content for the benefit of $h_2$. The engine 308 should be able to either prevent or detect such activity, and to provide proof of misbehavior in the off-line economic system.

The list of system characteristics somewhat resembles off-line usage of credit cards, with sellers being able to verify the defunct credit cards of cancelled members upon connecting with the issuing bank. One convenience of the off-line media distribution engine 308 is that it implements a credit card-like payment system that supports an incentive-based economy, which in turn benefits all parties involved in the distribution of digital content.

In one implementation, the off-line media distribution engine 308 satisfies the above list of system characteristics. That is, the buyer and seller authenticate each other, the buyer sends a signed incentive to buy, the seller sends a receipt, and only after acknowledgement by the buyer that the buyer received the receipt, the atomic transaction—transfer of the media goods from seller to buyer—is executed.

Initially, the authenticators 622 contained in the seller's and the buyer's devices authenticate each other. This is a task already provided for in many conventional cryptographic protocols such as SSL3.0 and TLS1.0. For example, if the TLS version 1.0 Handshake Protocol is used, the off-line media distribution engines 308 on each side of an off-line transaction perform several tasks:

The respective certificate managers 628 exchange certificates, $c_b$ and $c_s$; then, each certificate manager 628 verifies the other side's certificate by proving that $p_s = VP_{p_t}(s_s)$ and $p_b = VP_{p_t}(s_b)$ The respective key managers 632 exchange information to compute, for example, a 48-byte master-secret used to create session keys.

The two engines 308 agree that their respective encrypters 624 and data compressors 626 are compatible during the private communication that is to ensue.

The respective session managers 630 establish a session identifier as well as a flag specifying whether the session is resumable if interrupted.

In order to implement the device revocation capability, as described above, the seller's account verifier 634 checks whether the buyer has a valid account with the service provider 304. For this reason, in one implementation, service providers 304 synchronize connected media player devices with a latest list of "invalid" devices (i.e., via their public keys). In one implementation, in order to prevent the list from growing excessively long, each account has an expiration date specified in the account's certificate. Devices with expired accounts cannot purchase content. Thus, if buyer's account is expired or is on the list of revoked playing devices, the transaction is aborted by the account verifier 634. Otherwise, the off-line media distribution engine 308 proceeds with the buyer's commitment.

Because some malicious sellers may alter DRM information to redirect the benefit of transactions to a fabricated copyright holder 108, certain sellers may also be revoked by the account verifier 634. In this case, the buyer's account verifier 634 checks the seller against the seller's account expiration date or against a database of revoked seller accounts.

A content assurance engine 614 in the off-line media distribution engine 308 aims to make sure that the buyer receives the content that has been marketed by the seller. Note that the seller may forward a version of the content that is of inferior quality as a marketing ploy to the potential buyer. Thus, when committing to a purchase, the buyer wants an assurance that the clip of interest, a, has a particular identity and quality. The content assurance engine 614 can take many forms. Below are two examples.

A first implementation of the content assurance engine 614 is designed for the common scenario in which the buyer likes the media clip (e.g., by hearing or seeing it), but does not know the author (artist) or the title of the clip. In this scenario, the seller provides to the buyer the clip's cut-out (i.e., preview, header, promo, advertisement, etc.), $a_c$, which has been approved by the copyright holder 108 as an advertisement. In addition, the copyright holder 108 can provide purchasing data, such as that in Equation (1):

$$m'_1 = \{ID(a), s'_1 = SP_{rp}(H(a_c, ID(a)))\}, \quad (1)$$

where ID(a) returns the distinct identifier and descriptor of media clip a. This descriptor may include the clip's coding quality, version, copyright holder 108, license agreement, and price. Function H(a) may return a cryptographic hash (e.g., SHA-256) of the clip a. By allowing the buyer to listen to or see $a_c$, by computing $H(a_c, ID(a))$, and by verifying against $s'_1$ using the service provider's public key pp, this version of the content assurance engine 614 assures that the buyer will ultimately receive the clip a that the service provider 304 associated with the preview advertisement $a_c$.

Perhaps even more importantly, various marketing tools 606 can help the seller keep a competitive advantage on the market, for example, by not revealing the author and title of the advertised clip to a prospective buyer. This may increase the likelihood of the buyer buying the clip a on the basis of how it sounds or looks, regardless of its title and author. Implementations of the off-line media distribution engine 308 can enable this feature, in order to discourage a potential buyer from gaining the media clip's metadata—e.g., title and artist—in order to buy the clip elsewhere, that is, to prevent an occurrence of "discover only, buy elsewhere" (DOBE). To activate this feature, a seller who owns clip a can request the service provider 304 to provide a second kind of advertisement and purchasing data: $\hat{m}'_1 = \{I\hat{D}(a), s'_1 = SP_{rp}(H(a_c, I\hat{D}(a)))\}$, where $I\hat{D}(a)$ does not contain identifying information for clip a. The advertisement purchasing data $\hat{m}'_1$ can also be provided to a buyer by a seller as part of the sale. Another marketing tool 606 is the ability to attach a price to the advertisement $\hat{m}_1$, which a buyer (i.e., a potential future reseller) must pay to obtain. Finally, after purchasing the clip, the buyer obtains the full ID(a), with identifying information of the media clip a.

A second implementation of the content assurance engine 614 is designed for the common scenario in which the buyer knows the artist (author) and/or title, and buys the media clip "sight unseen," without preview. In this scenario the seller sends to the buyer fully informative purchasing data, as in Equation (2):

$$m''_1 = \{ID(a), s''_1 = SP_{rp}(H(ID(a)))\}. \quad (2)$$

Given the purchasing data of Equation (2), the buyer's content assurance engine 614 can verify that the seller is offering the desired clip, sometimes even without media preview.

Exemplary Off-line Transaction

The transaction engine 604 is truly flexible in keeping with the many possible marketing venues of an off-line economy 300 in which the off-line media distribution engine 308 may securely perform off-lines transactions. Thus, the price negotiator 636 and the license negotiator 638 allow the final price tag of a media clip to be adapted, dickered, negotiated, subjected to auction, etc. In sophisticated implementations of the off-line media distribution engine 308, the license negotiator 638 may arrive at a licensing "deal" in which the seller sells rights to use or sell media content in a certain manner, e.g., in a limited capacity or a limited number of copies or for a limited time.

Since the transaction engine 604 allows for flexibility and the pricing and licensing may be negotiated between buyer and seller, copyright holders 108 should exercise care in setting up pricing rules for their media content. Buyers and sellers may very well seek alternative payment channels (e.g., cash, trade, barter). In one extreme example, a copyright holder 108 does not assign a minimum price to the media content a to be distributed. The copyright holder 108 merely relies on incentives to the seller in the form of a percentage of revenue to motivate selling the content at as high a price as practical. In this example, the seller sells clip a at high price, but in under-the-table cash, thereby circumventing the off-line economy's incentive system. Then, the seller records a transaction price of $0 in the transaction history storage 616, to be reported to the service provider 304 as such. This allows the seller to retain the full realized revenue. In order to overcome this potential problem, the copyright holder 108 should use lower-bounded pricing minimums when setting up pricing/incentive rules.

In a typical transaction, when the buyer desires to purchase certain digital content, the purchase manager 640 has a transaction requester 646 that commits to the purchase by sending a signed intent of purchase ("purchase request") to the seller. From a contracts perspective, e.g., Article 2 of the Uniform Commercial Code (UCC)—"Sales"—the signed purchase request can be considered an "offer" and the receipt to be received back from the seller can be considered an "acceptance." Thus, in this sense, the transaction engines 604 of seller and buyer set up and execute legally binding contracts. However, very little of the fulfillment of the contracts is left up to the choices of the participants, the devices automatically execute the contracts, as they form.

The intent to purchase, $m_2$, can be represented by $m_2=\{i, S_2=SP_{rb}(H(i))\}$, where $i=\{m'_1, \|m''_1, b, s, P_c\}$ and $P_c$ contains purchase information such as date/time/location, license, and price. Participants who wish to protect their privacy can choose whether to record such data within the transaction receipt. Message PC can also include a request to buy an advertisement $\hat{m}_1$ for clip a, as described above. Thus, the buyer sends $m_2$ to the seller as a transaction request—an "offer" meeting all the criteria of a UCC Article 2 sales offer. The seller's purchase manager 640 can verify the buyer's purchase request using the buyer's public key $p_b$. In order for both sellers and buyers to protect their privacy, their public keys $p_b$ and $p_s$ can be used as pointers to transaction participants in message i, instead of their buyer and seller identities.

In one implementation, in order to prevent a software attack on the buyer's device as described above ("Mutual Initiation" section) the purchase manager 640 may allow the buyer's purchase request (commitment) to be sent to the seller only upon a signal at the purchase "button" interface 648 indicating actuation of a hardware-assisted approval by the buyer, e.g., that a "purchase" button on the buyer's device has been pressed.

The seller's receipt manager 642 can generate a UCC Article 2 compliant "acceptance" for the buyer's "offer," and allows the buyer to claim the purchase to the service provider 304 via an electronic receipt, $m_3$, from the seller. The receipt sender 650 may construct the receipt as: $m_3=\{P_r, SP_{rs}(H(j))\}$, where $j=\{m_2, P_r\}$ and $P_r$ contains receipt information required by the service provider 304. The buyer's receipt verifier 652 can verify the receipt using the seller's public key $p_s$ from the key manager 632. If the verification is successful, the buyer can claim clip a from the seller or if communication is unexpectedly terminated, the buyer can claim clip a from the service provider 304. If the latter event of broken communication occurs, the service provider 304 can credit the incentive to the seller's account based on the buyer's input, even without synchronization with seller's device.

In one implementation, upon receiving and verifying seller's receipt, the buyer's acknowledgement manager 644 sends an acknowledgement signal, $m_4$, back to the seller. The acknowledgement sender 654 may build the acknowledgement message as $m_4=SP_{rb}(m_3)$. When the seller's acknowledgement receiver 656 verifies the received acknowledgement, the seller can then claim the incentive, independent of any communication between the buyer and the service provider 304.

Hence, the buyer can commit the transaction with the service provider 304 independent of the seller after receiving the seller's receipt, $m_3$. On the other hand, for the seller to claim incentives independent of the buyer, the seller has to receive the buyer's acknowledgement, $m_4$.

Upon receiving and verifying the acknowledgement, $m_4$, the seller's media transfer engine 612 can start with an upload of the purchased media clip, via the communication engine 602. The media content to be transferred is encrypted with a session key derived by the key manager 632. The buyer can immediately start enjoying the purchased clip, even though there has been no communication with the service provider 304. If the transaction included the corresponding advertisement purchasing data $\hat{m}'_1$, as described above (i.e., a clip preview), then the seller uploads this data as well.

The act of downloading the media clip in the off-line economy 300 is a matter of mutual agreement between the buyer and the seller. The downloading can be interrupted by lack of power, communication, or even intentionally at either one of the devices. Importantly, the overall transaction is not affected by an unsuccessful media content download, as both buyer and seller have their respective receipts, as retained in the transaction history storage 616, to claim the media content and the incentive independently of the other entity.

The off-line economy 300 may introduce certain nuanced fairness issues, to be described below. The performance of the media transfer engine 612 (i.e., the bandwidth usage for uploading the media content) can also be priced and guaranteed.

The seller is credited with incentives upon the following two events:

The seller received a valid acknowledgment, $m_4$, in which case the off-line media distribution engine 308 submits the following message, $\{m_3, m_4\}$, to the service provider 304. Upon successful verification of signatures in $m_3$ and $m_4$, the service provider 304 credits the seller with the incentive and forwards the remainder of the revenue to the copyright holder 108 associated with clip a.

In an alternate case, the buyer never received the purchased digital content. When the buyer contacts the service provider 304 to download the media content from its server with a proof of purchase—the seller's receipt $m_3$—the seller then is credited with his incentive. Both actions are executed pending a successful verification of signatures in the receipt, $m_3$, by the authenticator 622.

Hence, communication failure can occur in the latter steps of the transaction and still the transaction can be committed, either by the buyer or the seller contacting the service provider 304. If communication failure or some other nonconforming occurrence happens in the earlier steps, i.e., before the seller's receipt is received by the buyer, then the transaction is voided.

Reputation Incentives

Interestingly, communication between the seller's and buyer's devices can be terminated for whatever reason after the seller's receipt is received but before the buyer's acknowledgement is sent. In such a case, reporting the transaction is up to the buyer. If the transaction is reported, the buyer obtains the purchased media content and the seller receives the incentive. If the buyer decides not to obtain the purchased media content, then the seller never receives the incentive, as the transaction is never fully committed by the buyer to the service provider 304. Later, the buyer could possibly obtain the same media content from some other source. Such a course of action may be perceived as unfair to the first seller. This problem was introduced above as the "discover only, buy elsewhere" (DOBE) scenario. The DOBE fairness issue can be addressed by the off-line media distribution engine 308 from two perspectives.

First, the scenario introduced above, of enabling a seller to advertise a clip without revealing identifying information about the clip, can prevent the DOBE scenario in which the buyer goes elsewhere to purchase the clip. Since the advertisement purchase data $\hat{m}'_1$ can be priced, then in a free market the probability that a buyer will leave a transaction with information about the clip is likely to make the price tag on $\hat{m}'_1$ higher. Hence, if a seller deems that a DOBE scenario is likely in the present environment, the seller can purchase a non-identifying preview, $\hat{m}'_1$, to add to the marketing tools 606 for the sales presentation manager 608 to use while marketing.

Even without using an advertisement purchase data message that does not identify the media clip, the seller can still take certain actions to prevent a DOBE scenario. A reputation engine 618 can report the receipt of $m_2$ from the buyer to the service provider 304. As $m_2$ contains ID(a), with a simple lookup into its transaction database, the service provider 304 can verify whether the buyer has bought the same clip elsewhere. Then, several actions are possible. The least costly is to affect the buyer's reputation. Just as in common trading markets such as EBAY, a buyer's or a seller's reputation is evaluated from a set of positive and negative transaction closures. This approach may have certain negative effects on the off-line economy 300. If users see their reputation as an important leverage, it is beneficial for sellers to use a push marketing model to push advertising to prospective buyers hoping that they will be the first seller to offer a clip that the buyer will eventually buy. As buyers can shop for only few clips at once, one way to prevent being flooded with advertising for the media clips, is to disable push marketing.

But since the benefits of push marketing are likely to be higher than the adverse effect of DOBE scenarios, in one implementation of the off-line economy 300, preventing DOBE is the responsibility of the seller, and buyers who commit DOBE—window shop with one seller but buy with another seller—are not penalized in the off-line economy 300.

The concept of buyer and seller reputations, common in on-line marketplaces, can be enforced in the exemplary off-line economy 300 as well. For example, the service provider 304 can maintain reputations by issuing reputation certificates to users upon their synchronization. Each certificate may include a reputation quantifier that can be verified by the reputation engine 618 of another party or by the other party's account verifier 634. Upon claiming a sale transaction, the service provider 304 updates the user with the most current reputation status. If the user is a seller, this reputation update should be credited before issuing the corresponding transaction incentive to the seller. Otherwise, sellers can receive credits and never update their favorable reputation mark.

Finally, since a user with a "broken" media player device can reinstate a favorable reputation at will, frequent expiration dates on such reputation certificates can ensure that users perform frequent updates of their reputation status.

Marketing the Off-line Bandwidth

The transfer of goods while both devices are off-line, that is, the media download, has functional value for both the buyer and the seller. The buyer can obtain and play the content immediately. The seller, however, may expend additional energy to transfer a relatively large media file to a buyer. The seller may choose to avoid uploading the media file in order to preserve energy, which in some circumstances might be deemed as unfair. A Bluetooth-enabled device transfers data at a rate of approximately 721 Kbps or less; low-cost Zig-Bee transfers data at rates up to 250 Kbps; and relatively expensive 802.11g devices transfer data at approximately 54 Mbps. Because a typical media clip can be in the 2-8 MB range, download can take substantial time and produce a significant energy bill. To address this issue, in one implementation, the off-line media distribution engine 308 enables the seller to price the actual download into the transaction. Thus, the buyer can obtain a purchase receipt for one price and both the purchase receipt and the actual media content for another, higher price.

In order to realize such a transaction, the buyer can specify the type of transaction (purchase receipt only or purchase receipt plus the media content) as well as the price when creating the purchase request, $m_2$. This can be denoted in the field $P_c$ during formation of the buyer's purchase request.

Figure 8:
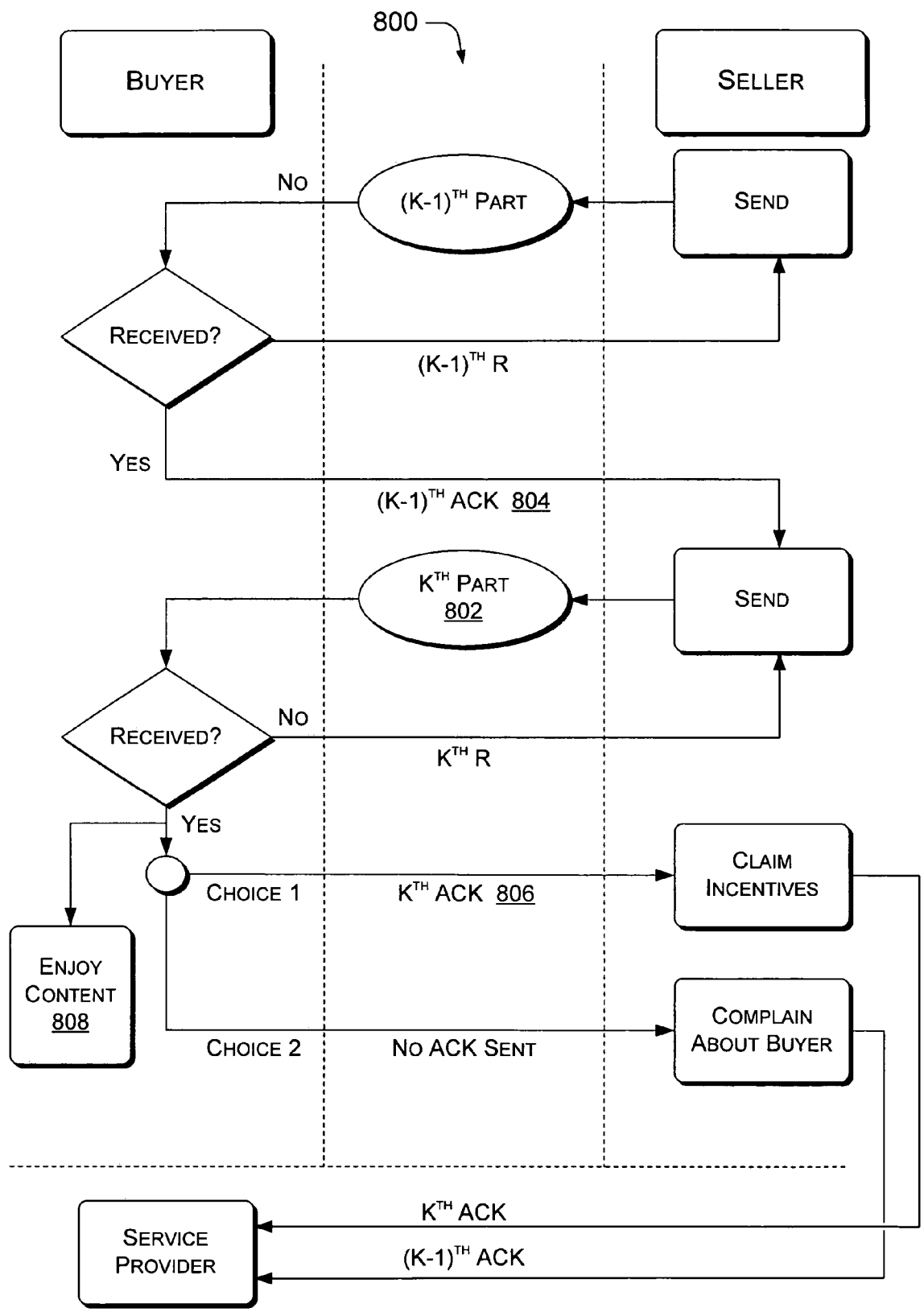
FIG. 8 is a flow diagram of an exemplary method of marketing off-line bandwidth for uploading purchased media content.

FIG. 8 shows one exemplary method 800 of uploading the purchased media content to the buyer for a price. In this implementation, at the time of content upload, the seller partitions the content a into K packets and sends them independently to the buyer. The purpose is to require the buyer to upload all K packets in order to play any perceptually significant portion of clip a. Thus, the seller's key manager 632 initially generates a fresh encryption key k, encrypts clip a in CBC mode (denoted as $E_k(a)$), and creates a message e=k$\|E_k$(a). The seller's media transfer engine 612 then partitions message e into K parts, $\{e \ldots, e_K\}$, which it sends to the buyer in decreasing order of their index, i.e., part $e_1$ is the last, K-th packet, $e_K$ 802 sent to the buyer. The buyer's media transfer engine 612 follows the receipt of each packet with an acknowledgement of receipt. The last two acknowledgements in the process, $ack_{K-1}$ 804 and $ack_K$ 806, are signed by the buyer's authenticator 622, where $ack_1 = SP_{rb}(H(i\|j))$. After receiving $ack_{K-1}$ 804, the seller transfers the last packet, $e_K$ 802. The buyer can decrypt and play the media content 808 after this last step. However, the buyer is still required to send $ack_K$ 806 to the seller. When the seller's media transfer engine 612 receives $ack_K$ 806, the seller can claim the additional pricing incentive to the service provider 304 for uploading the sizable media clip by supplying $ack_K$ 806 with the transaction receipt and the receipt acknowledgment ($m_3$, $m_4$) used to otherwise claim an incentive.

Several incident cases may arise in this procedure. First, the buyer may receive $e_K$ 802 but fail to send $ack_K$ 806 to the seller due to loss of power or broken communication. However, the buyer can acknowledge the completion of this transaction when the buyer's off-line media distribution engine 308 synchronizes with the service provider 304. Hence, in this particular case, the seller depends upon the buyer to eventually communicate with the service provider 304 in order to claim the seller's incentives.

Secondly, after receiving $e_K$ 802, the buyer may maliciously choose to not send $ack_K$ 806 to the seller so that the buyer can obtain the service of downloading the content off-line for free (although the buyer must still must pay for the purchase receipt in order to free-ride the download of the content).

Third, the buyer may not have sent $ack_K$ 806 because the buyer's media transfer engine 612 never received $e_K$ 802; in this case the seller cannot distinguish between the first and second scenarios above because communication with the buyer has ceased.

In one implementation, the off-line media distribution engine 308 can address the problem of distinguishing between the malicious and non-malicious scenarios described above using at least two strategies. In a first strategy, users are not allowed to decide upon individual protocol actions. Thus, in order to be able to alter the protocol steps, the buyer would have to "break" the media device's tamper-resistance and alter its software; two actions that would incur substantial cost. Second, after an incomplete transaction the seller can inform the service provider 304 of the incident. The report includes $ack_{K-1}$ 804 in addition to the other messages ($m_3$, $m_4$) described above for claiming the seller incentive. Since the likelihood of the third case described above is relatively small, the service provider 304 can affect the reputation of the buyer and additionally charge the buyer for the seller's incentive.

Thus, user reputation becomes a probabilistic reflection of economic trustworthiness. Even a perfectly policy-obeying buyer is expected to have certain small percentage p of negative feedback. This expectation can be reduced proportionally to the size of $e_K$, i.e., for that reason, it can be assumed that $e_K$=k. For systems where $p \ll 10^{-2}$, malicious parties can obtain negligible benefits by performing the malicious second scenario, above, at a rate of approximately every 1/p transactions.

Privacy

In any setting where tamper-resistant hardware hosts protected software, the issue of privacy is typically raised. Privacy and security often affect each another and in certain cases it is difficult to ethically resolve and define the rightful balance (e.g., accurate crime reporting versus protection of privacy). The exemplary off-line economy 300 adopts a common but controversial standard applied in banking and other services where the service provider as a trusted authority keeps record of all transactions in a manner that protects user privacy. With all the ambiguities of such a protection standard, the frontier for privacy protection can be defined from the perspective of the buyer and seller. Ultimately, it is undesirable for the buyer or seller to be able to show a transaction receipt to a third party in order to compromise the privacy of the seller or buyer on the other side of the transaction, and further, to reveal the purchased media content associated with the compromised identity.

The buyer and the seller exchange identifying information when the authenticator 622 establishes a secure connection. As the public key of either of the users is sufficient to pinpoint its owner, it is important to anonymize user public keys while retaining their full functionality and system security. This can be achieved by distributing single-usage public-private key-pairs to users. A participant in a transaction can optionally use such a key-pair in case the participant wants to stay anonymous.

Such key-pairs are supported with certificates issued by the service provider, which can set correct expiration dates and reputation scores. Single-use key-pairs are not included in revocation lists checked by the account verifier 634.

Fraud Prevention Strategies

As mentioned above, a seller could take an arbitrary existing clip associated with a certain copyright holder $h_1$, re-edit its DRM information, create a new entry, $h_2$, in the list of copyright holders, and assign the proceeds of sales of this new clip to $h_2$. To prevent this copyright redirection, $h_1$, or its service provider 304 may continuously scan existing content on the market for similar songs either based upon title or content similarity. In the first case, text-only similarity is searched by a forensic robot; in the latter, content may be analyzed for similarity to other content using multimedia fingerprinting. This is similar to forensic activities media studios already currently perform on file-sharing systems. Due to the distributed nature of the proposed offline economic platform 300, the copyright holders 108 can offer rewards to entities that discover fraudulent copyright misdirection.

Each device using an exemplary off-line media distribution engine 308 can be protected by using tamper-resistant hardware in order to satisfy in order to thwart some of the threats listed further above. Fraudulent activities can be collectively assigned a one-time non-trivial cost a for "breaking" a media player device. Approximately, $\alpha \approx \beta$, where device cost is denoted as $\beta$.

The difficulty of breaking tamper-resistant hardware can be enforced using two different approaches: active zeroisation and passive techniques. Active zeroisation aims to destroy core information (in this case, user certificates) within a certain amount of time from detecting the tampering. Zeroisation is typically used in the absence of a power supply. Standards for such devices are outlined in standards ANSI X9.17 and FIPS 140-2. Commonly, such techniques are particularly applied in hardware security modules. Passive techniques rely on a chemical coating, which is difficult to tamper with. A media device, including the off-line media distribution engine 308, with built in tamper-resistance should be as deployable as smart cards, which are widely used in numerous applications as their tamper-resistance makes them sufficiently cost-effective. The scale of piracy is estimated to be much lower than that of on-line credit card usage, which is currently at approximately 0.25%. Thus, systems similar to media devices containing the exemplary off-line media distribution engine 308 have demonstrated economically efficient security and usability.

"Legalizing" "Pirated" Content

It is commonly assumed that significant percentage of the content populating media players today is obtained via "file sharing" and without the approval of content's copyright holder 108. One of the features of the exemplary off-line economy 300 is its ability to "register" such content back into the media that generates revenue in the ecosystem. A user x who owns a clip y obtained via file sharing, wants to obtain one of y's marketing headers: $m'_1(y)$, $\hat{m}'_1(y)$, or $m'_1(y)$, from the service provider p. In this case, p can ask x to submit H(y) which he uses to identify y. Upon identifying y, the corresponding headers are sent to x who can now legally participate in the economic ecosystem.

It is important to stress that during its file sharing lifespan, most content survives several iterations of recompression which produce perceptually similar but bit-wise different content copies that all have unique cryptographic hashes. Thus, their hashes cannot be used to pinpoint appropriate corresponding marketing headers. This problem can be resolved in two ways: automatically and manually. The automatic solution assumes existence of a fuzzy hash function that maps arbitrary perceptually similar versions of the same clip into fuzzy hashes (i.e., media "fingerprints") that are "close" in a certain distance metric (e.g., a Hamming distance). Such functions are typically not cryptographically secure, and hence can be exploited by adversarial users to point to arbitrary identities to mimic copyright holders 108—a problem that can be detrimental to the system.

The manual solution involves the copyright holder 108, the service provider 304, and/or a third party listening and approving K different copies $y_1, \ldots, y_K$ of the same perceptual value y as authentic and valid for sale. Then, the service provider 304 computes and stores $H(y_1), \ldots, H(y_K)$ along with H(y) in its database entry for y. As file sharing systems 200 typically have typically only a few sources of incoming media, it is expected that large percentage of already distributed "shared" and altered copies of a given clip have only a few distinct versions.

Economic Gains

One of the features that the exemplary off-line economy 300 exhibits is its ability to create an isolated economic ecosystem. Unless the tamper-resistant hardware can be trivially broken by ordinary users, one of the major benefits is its tendency to favor free trade as the sole principle for resolving economic uncertainties. While mathematical models can accurately predict market behavior to a certain extent, most of the events and decisions in free markets occur ad-hoc. Even in simple isolated scenarios such as Vickrey auctions, it is often difficult to analytically model market behavior. In many cases, mass psychology and different levels of social and scientific uncertainty give markets the impetus that governs global economic trends. Below, the economic effect of the exemplary off-line economy 300 is analyzed without much mathematical modeling.

One of the crucial mathematical tools that can be used to describe the exemplary off-line economic platform 300 is that of a time-varying graph G(n,E(t)), where players are modeled as nodes n and their connectivity with edges E(t) that appear and disappear over time t. Content populates such a network based on its attractiveness, connectivity E(t) variance, locality of node motion, and price/incentive levels. The price and the incentive are the only parameters that can be trivially controlled by the copyright holder 108; all other parameters are subject to a relatively high level of uncertainty.

Free trade is one of the crucial features that sets apart the exemplary off-line economy 300 existing ones. The operability of the entire platform depends in large part upon the incentives that sellers receive. In the vastly complex network of human interactions, it is the price and seller's incentive that can drive up or down overall revenues of digital goods. From the perspective of the copyright holder 108, these two parameters should be valued over time such that they maximize the copyright holder's 108 global revenues. As E(t) is rarely affected by content attractiveness, within existing E(t) patterns, the goal is to spread the content, i.e., build a sales and marketing network, while making maximum revenues. The exemplary off-line economic platform 300 does not impose any inherent roadblocks to free trade—on the contrary, it can provide the copyright holders 108 with a set of tools that they can use to maximize profit given particular content attractiveness, with significantly improved controllability compared to existing mechanisms. A small set of these tools are evaluated below.

Viral marketing is a form of announcing services and capturing market share that has already been proven and analyzed as exceptionally effective in several cases. For example, free email services such as HOTMAIL and YAHOO mail had fast adoption curves because emails sent through them contained an ad for the service. For example, HOTMAIL spent only around $50,000 on traditional marketing but still grew to 12 million users in 18 months. GOOGLE's GMAIL captured a significant market share in spite of the fact that the only way to sign up for the service is through a referral.

For the exemplary off-line economy 300, content marketing can be based solely on the viral effect. For certain types of media, it can allow the copyright holders 108 to probe the market for competitive pricing and build a sales and marketing network without any additional investments. In the extreme case, copyright holders 108 can become service providers—the only marketing and sales investment might be a single server and original copies of the offered digital content strategically distributed in G. High-appeal content is likely to fetch large revenues that can, depending on market conditions, be larger than those in existing systems. The exemplary off-line economy 300 makes this possible with an investment that should be affordable to most people.

On the other hand, service providers may count on market research revenues from copyright holders 108 as they have partial access to G, which can be used to develop strategies for market penetration, time-varying pricing, incentive calculations, and deployment of complex business models such as a market basket model.

Computing resources such as storage and bandwidth are fully distributed in the exemplary off-line economy 300. While client-server distribution architectures require significant resources and administrative expenses, in the exemplary off-line economy 300, much like in a peer-to-peer network, these costs are miniaturized. On the other hand, as opposed to a traditional peer-to-peer system which typically initiates a free file sharing service 200, the trade in the exemplary off-line economy 300 builds an economic ecosystem.

Building optimal pricing strategies and business models in the exemplary off-line economy 300 is difficult without access to g and an accurate assessment of content's appeal to users. Nevertheless, the exemplary off-line economy 300 poses almost no constrains on the selected business models. In the following subsection, market probing strategies are evaluated as one of the features that the exemplary off-line economy 300 can offer due to its responsiveness, while traditional markets cannot offer this feature.

Market Probing Pricing

Figure 9:
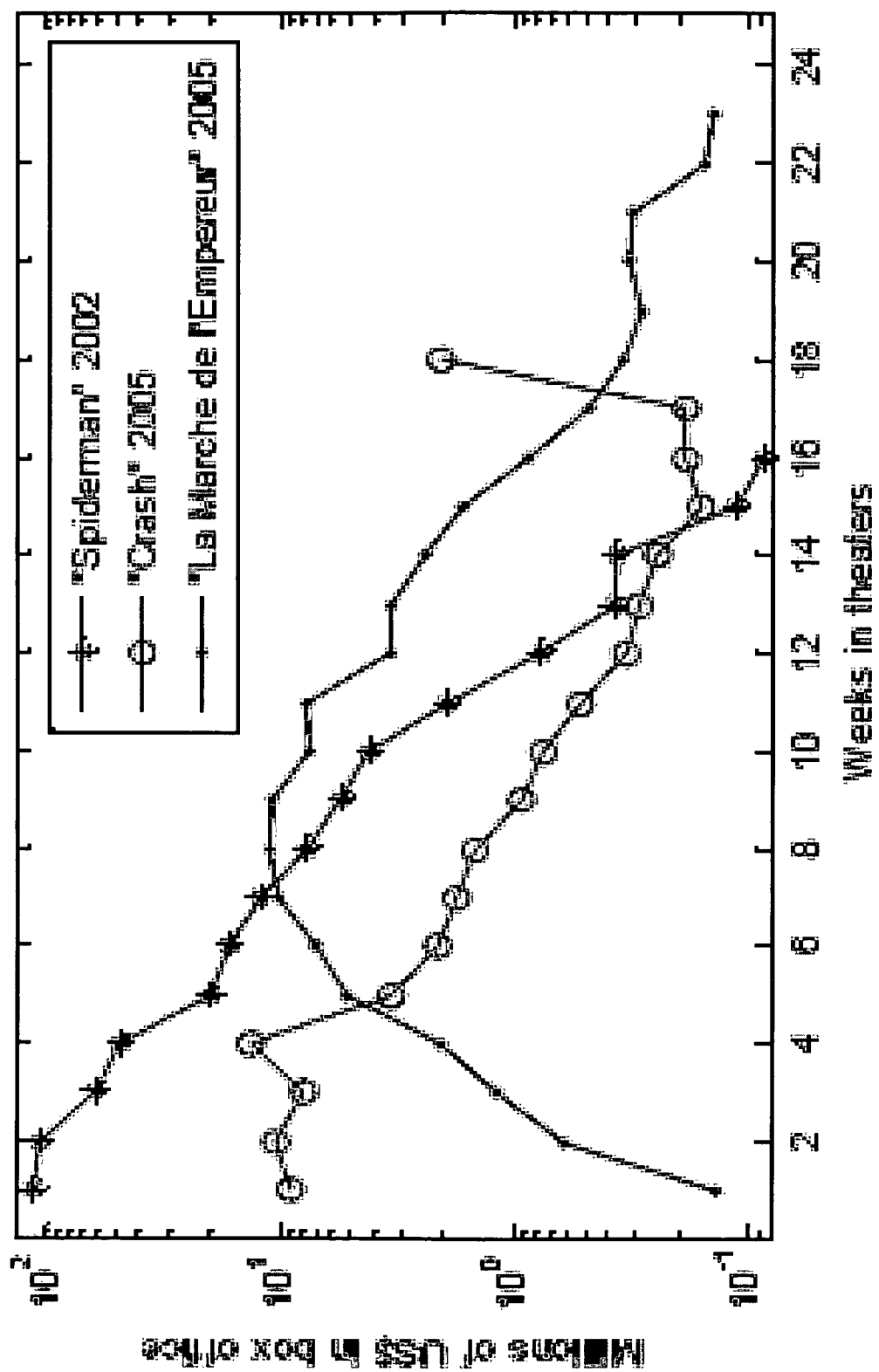
FIG. 9 is a diagram of a revenue data diffusion pattern for illustrating exemplary market probing pricing.

Over the lifespan of a typical product, revenue data follows a diffusion pattern that can differ greatly across different product groups. In this case, of particular importance are diffusion patterns of content marketed and sold on-line such as digital media (images, sound, video), software and digital interactive arts (video games), e-books, etc. For example, FIG. 9 illustrates the diffusion pattern of the 2002 movie "Spiderman"—although largely successful, with over $400 million in revenue from the US box office alone, it is arguable whether variable pricing, if possible, would have fetched more revenue to the copyright holder 108. One key to the problem of optimal pricing is the complex dependency of the price p(t) and demand n(t) curves over product's lifespan. Copyright holders' analytical task is simple: to maximize revenues as shown in Equation (3):

$$\underset{p(t)}{\operatorname{argmax}} \int_{t=0}^{\infty} p(t)n(t)dt$$

i.e., under the assumption that function $$f() \stackrel{\Delta}{=} n(t) = f(p(t), t)$$

is well understood. Diffusion patterns for media in question have high degree of uncertainty. Still, certain ad-hoc pricing methods such as market probing can potentially aid the copyright holder 108 in maximizing profits. The key idea behind market probing is to vary the selling price among a relatively large set of independent vendors with an objective to quickly estimate f( ). "Independent" means in a sense that customers who shop at one vendor are not likely to visit other vendors. In the exemplary off-line economy 300, since media players can be connected via the Internet 192 and can price compare different sites, the copyright holders 108 can enforce probing transactions only via near-field communication (e.g., Bluetooth). As an analytical study for optimizing the objective in Equation (3) under different f( )-models is beyond the scope of this description, but the logistics how interested parties can obtain data to estimate f( ) in the exemplary off-line economy 300 can be described.

Market probing requires two attributes from the economic ecosystem. One is the ability to change the price quickly. The second is an ability to have a relatively large number of independent vendors. The traditional brick-and-mortar store model typically does not allow quick price changes. Also, on-line media stores such as ITUNES 104, do not constitute of a large number of vendors. The exemplary off-line economy 300 has both of these functionalities. When a copyright holder 108 introduces new media, the content is distributed to a set of vendors on a test basis (analogous to beta versions in the software industry). These vendors sell the content at varied prices generating the sample sales distribution data at various prices. A problem with this schema is that vendors themselves may have a set formula for determining their selling price. A relatively simple heuristic circumvents this problem.

A studio that is premiering a new piece of digital content, may progressively introduce it to a growing set of independent vendors. The selling price (to vendors) can be randomized and decreased at a slow pace as new vendors are included in this test set. Thus, various vendors get the content at various different prices. Whatever fixed formula the vendors use to determine their selling price, it is likely that there is a reasonable variation in their selling prices because of the variation in their purchasing prices. This generates the sample sales figure data at various prices for the copyright holder 108. Under the assumption that copyright holders 108 have the ability to extrapolate f( ) from this sample sales distribution data, they can estimate the diffusion curve and the optimum pricing strategy p(t).

The copyright holders 108 can improve their decisions by following well studied slow-diffusion curve models particularly applicable to music. The popularity curve for a music clip unrolls in several phases typified by different kinds of buyers: innovators, early adopters, early majority, late majority, and laggards. Innovators are people who makes a concise effort to obtain the music clip. Early adopters are willing to try the music, if spontaneously discovered, to see whether it is worth its price. Early majority follow the hype created by the early adopters. Late majority purchases the content knowing that majority of others who tried it, liked it and found it worth its price. The major difference between early majority and late majority is that during the early majority phase, the clip's popularity is growing and vice versa. Laggards represent the long tail. In the case of classic artwork, this tail could be long.

The exemplary probing heuristic introduced herein assumes that if early adopters are willing to pay a higher price for a piece of music A than for another clip B, then early majority would also be willing to pay a higher price for A than for B. If B is a previously marketed clip then the market probing provides some guidance in pricing A with respect to the price of B during the same phase of its diffusion cycle. The exemplary market probing schema can be seen in this subjective sense described here, rather than in a rigorous mathematical sense. Further, since most of the revenue is realized during early majority and late majority phases, the market probing during the early adopters phase can be done at a low overhead to reap the benefits during early majority and late majority phases. The following are the stages in an exemplary market probing pricing:

The copyright holder 108 sells the clip to innovators at relatively high, slowly decreasing, random prices. Prices can be set as pseudo-random variable seeded using the innovator's identity. Innovators, by definition, most likely pay whatever reasonable price they are offered.

Innovators in their daily routine offer the music for trial to early adopters. Most early adopters, try the music and purchase it if they think it is worth the price they are being offered.

The copyright holder 108 obtains the early sales data: the percentage of early adopters at each price point.

The copyright holder 108 compares the acquired data with historical data, especially data of those clips which had similar semantic value for early adopters.

The copyright holder 108 uses historical data as a guidance to set p(t) during other phases of the diffusion cycle.

As more data is coming, the copyright holder 108 can gradually downward-adjust p(t) during the entire diffusion cycle.

The above exemplary heuristic is an example of a strategy that copyright holders 108 can perform in the proposed exemplary economic ecosystem 300. The optimality and efficacy of the strategy may be dependent upon f( ). As appropriate historical data should be a solid predictor for f( ), it is probable that the exemplary off-line economy 300 gives copyright holders 108 the ability to quickly estimate f( ) and generate "best-effort" p(t), a feature that none of the existing content distribution models can support.

Exemplary Methods

Figure 10:
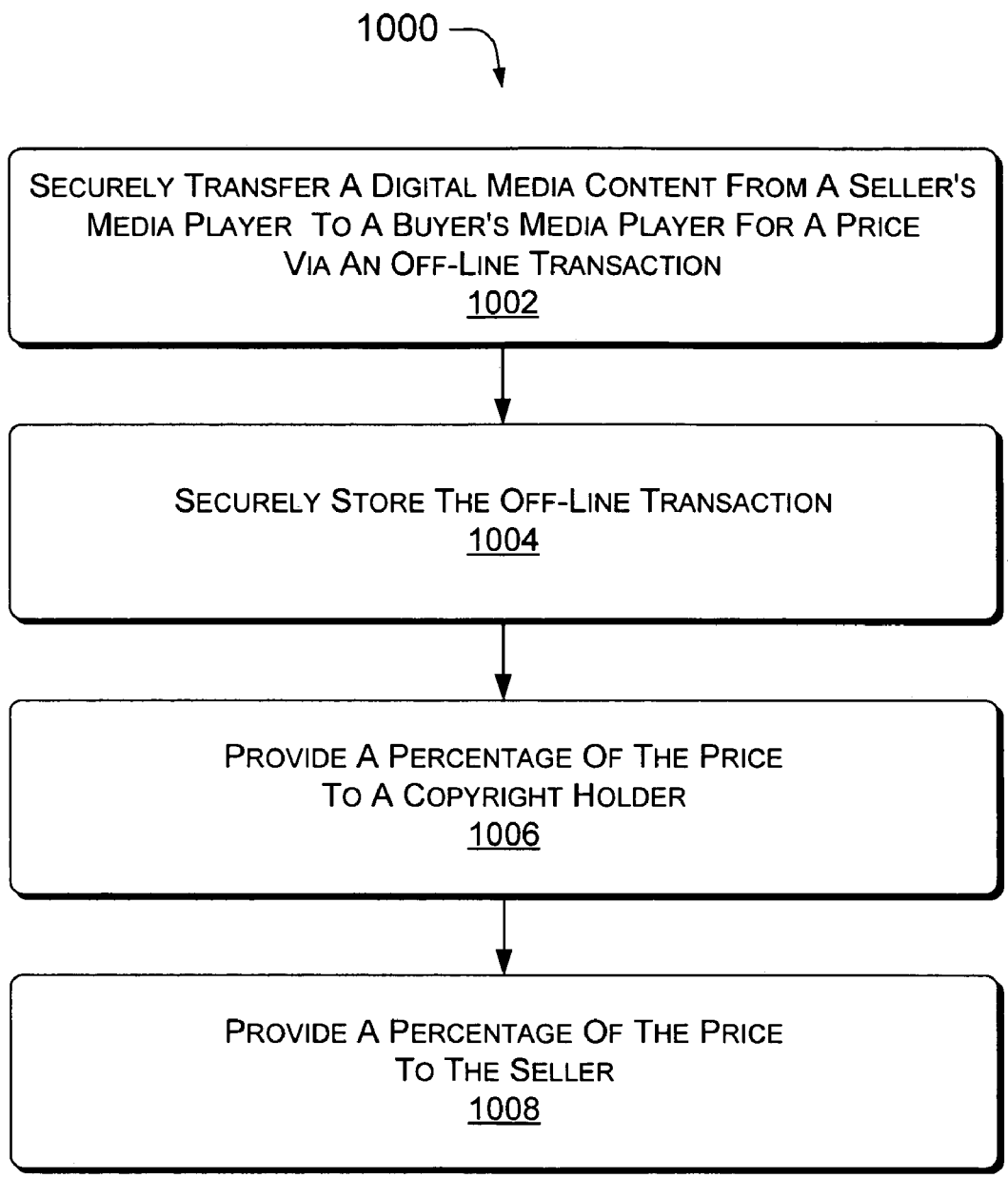
FIG. 10 is a flow diagram of an exemplary method of distributing media content via off-line transactions.

FIG. 10 shows an exemplary method 800 of distributing media content via off-line transactions. In the flow diagram, the operations are summarized in individual blocks. Parts of the exemplary method 1000 may be performed by software, hardware, or combinations of hardware, software, firmware, etc., for example, by components of the exemplary off-line media distribution engine 308.

At block 1002, digital media content is securely transferred from a seller's media player to a buyer's media player for a price via an off-line transaction. The media content is transferred off-line, e.g., by a Bluetooth communication channel established between the off-line media players. Because this peer-to-peer transaction is off-line, two media player owners may transact the sale of media content anywhere, at anytime. No external apparatus is required for the sale transaction to be completed and for the buyer to immediately obtain the media content from the seller and begin playing it. In one implementation, the media player devices reckon the monetary aspects of the transaction later, when one or other of the devices is connected to the Internet. A service provider or clearinghouse can keep track of accounts and entities involved in the off-line transactions.

At block 1004, details of the off-line transaction are securely stored. In one implementation, since both media devices are off-line, a record of the off-line transaction is built on both devices as the transaction unfolds. That way, if the transaction is interrupted, each side has proof of whether they deserve content or monetary remuneration.

At block 1006, a percentage of the sale price (even if the "price" is not money—it does not have to be) is credited to the copyright holder who owns rights to the media content that has been bought and sold.

At block 1008, a percentage of the sale price is credited to the seller, as a reward for selling and as an incentive to sell more. If anything goes wrong in the off-line sales transaction, the seller can still claim the incentive by offering proof to a service provider in the form of an acknowledgement sent by the buyer that the buyer received a sales receipt. The buyer on the other hand, can claim rights to download the media content by offering proof to a service provider in the form of the sales receipt sent by the seller. All of these proofs, receipts, and acknowledgements are typically electronic, of course, and therefore protected by an exemplary secure cryptographic protocol developed for the distributed off-line economy and described in detail above.

Conclusion

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary distributed off-line economies for digital media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
    authenticating off-line each other between a first user and a second user;
    checking off-line whether the second user has a valid account with a service provider;
    negotiating freely off-line a price via an off-line sales transaction for a secure off-line transfer of a digital media content from a first media playback device of the first user to a second media playback device of the second user, wherein the off-line sales transaction comprises:
        receiving a cryptographically secure purchase request from the buyer;
        verifying the cryptographically secure purchase request using a public key of the buyer;
        sending a cryptographically secure transaction receipt to the buyer who verifies the cryptographically secure transaction receipt using a public key of the seller; and
        receiving a receipt acknowledgement from the buyer, wherein the receiving completes the sales transaction;
    securely storing off-line a proof of the off-line sales transaction between the first user and the second user in both of the first media playback device and the second media playback device, wherein the second user can enjoy the digital media content off-line without limitations and without paying the price right after the off-line sales transaction;
    providing a first percentage of the price, by the first user, to an owner of a copyright of the digital media content based on the proof stored in either the first media playback device or the second media playback device; and
    receiving a second percentage of the price by the first user based on the stored proof,
    wherein the off-line authentication, the off-line checking, the off-line negotiating, and the secure off-line storing comprising a peer-to-peer link involving no communication link to the world outside of the first media playback device and the second media playback device.

2. The method as recited in claim 1, wherein the off-line transaction comprises a cryptographically secure sales transaction protocol.

3. The method as recited in claim 1, wherein the off-line transaction comprises using a cryptographically secure sales transaction protocol, including:
    sending a cryptographically secure purchase request from the second media playback device to the first media playback device;
    sending a cryptographically secure transaction receipt from the first media playback device to the second media playback device; and
    sending a receipt acknowledgement from the second media playback device to the first media playback device.

4. The method as recited in claim 3, wherein the purchase request includes purchase information selected from the group of data consisting of date, time, location, license, and price.

5. The method as recited in claim 3, wherein the second media playback device verifies the transaction receipt using a public key of the first media playback device.

6. The method as recited in claim 1, wherein prior to the off-line transaction the first and second media playback devices:
    authenticate each other by exchanging certificates;
    create a session key;
    establish a data encryption and a data compression capability; and
    establish a session identifier.

7. The method as recited in claim 1, wherein the off-line transaction comprises at least part of a transaction selected from the group of transactions consisting of: a coupon redemption transaction, a gift certificate transaction, a rewards program transaction, a multi-tier sales transaction, a script transaction, a bartering transaction, a loan payback transaction, a cross-licensing transaction, a sales promotion transaction, a loss-leader transaction, a charitable fundraising transaction, a market-basket transaction, a subscription transaction, an auction transaction, a trade-for-fee transaction, a multi-party transaction, and a multi-item discount transaction.

8. The method as recited in claim 1, further comprising reselling the digital media content from the second user to subsequent users, including:
    transferring the digital media content from the second media playback device to a subsequent media playback device for a subsequent price via a subsequent off-line transaction;
    providing a first percentage of the subsequent price to the owner of the copyright of the digital media content; and
    providing a second percentage of the subsequent price to the second user.

9. The method as recited in claim 1, wherein providing the first and second percentages of the price to the owner of the copyright and to the first user, respectively, includes sending a notification of the off-line transaction to a service provider, wherein the service provider debits an amount of the price from an account of the second user, provides the first percentage of the amount to the copyright owner, and provides the second percentage of the amount to the first user.

10. The method as recited in claim 9, wherein either the first media playback device or the second media playback device sends the notification of the off-line transaction to the service provider, wherein regardless of whether the first or second media playback device notifies the service provider, the service provider debits the amount of the price from the account of the second user and provides the first percentage of the amount to the copyright owner and the second percentage of the amount to the first user.

11. The method as recited in claim 1, further comprising sending a preview of the digital media content prior to the off-line transaction from the first media playback device to the second media playback device, wherein the preview verifies an identity and a quality of the digital media content.

12. The method as recited in claim 1, further comprising sending a preview of the digital media content prior to the off-line transaction from the first media playback device to the second media playback device, wherein the preview presents a sample of the digital media content but does not identify a title or an author associated with the digital media content.

13. The method as recited in claim 1, further comprising selling an advertisement of the digital media content to the second user via the off-line transaction, wherein the advertisement is used by the second user to resell the digital media content to subsequent buyers of the digital media content and to resell the advertisement to subsequent buyers of the advertisement.

14. The method as recited in claim 13, wherein the digital media content comprises pirated media content; and further comprising:
    applying the advertisement to the pirated media content;
    and reselling the pirated media content via subsequent off-line transactions to increase a revenue to the copyright holder.

15. The method as recited in claim 1, further comprising establishing:
    a first price for a completed download of the digital media content from the first to the second media devices using an amount of bandwidth;
    a second price for a transaction receipt giving permission to download the digital media content at some future time; and
    wherein the second user sends to the first user an acknowledgment for a completed download of the digital media content, the acknowledgement enabling the first user to claim the first price for the transaction.

16. The method as recited in claim 15, further comprising negatively affecting a buyer reputation of the second user if the second user does not obtain the completed download of the digital media content.

17. The method as recited in claim 1, further comprising negatively affecting a seller reputation of the first user when the first user transfers an incorrect or a low quality version of the digital media content to the second media playback device.

18. A media player comprising:
    a storage medium configured to store digital media content for a seller in the media player;
    an off-line communication engine configured to communicate off-line with an other media player used by a buyer;
    an off-line media distribution engine configured to negotiate sale prices and securely buying and selling a media content off-line, wherein a first percentage of each sale price is applied to a copyright holder associated with the media content being sold and a second percentage of each sale price is applied to the seller of the media content;
    an authenticator configured to provide off-line secure transactions between the media player and the other media player;
    an account verifier configured to check off-line whether the buyer has a valid account with a service provider; and
    a transaction history storage configured to securely store off-line a proof of an off-line sales transaction between the seller and the buyer in both the media player and the other media player, wherein the buyer can enjoy the digital media content off-line without limitations and without paying the sale price right after the off-line sales transaction, wherein the off-line sales transaction comprises:
        receiving a cryptographically secure purchase request from the other media player;
        verifying the cryptographically secure purchase request using a public key of the buyer;
        sending a cryptographically secure transaction receipt to the other media player which verifies the cryptographically secure transaction receipt using a public key of the seller; and
        receiving a receipt acknowledgement from the other media player, wherein the receiving completes the sales transaction,
    wherein the off-line communication engine, the off-line media distribution engine, the authenticator, and the account verifier are further configured to interact with the other media player of the buyer via a peer-to-peer link involving no communication link to the world outside of the media player of the seller and the other media player of the buyer.

19. The media player as recited in claim 18, further comprising an authenticator to provide secure communication and secure transactions between the media player and the second media player.

20. The media player as recited in claim 18, wherein the off-line media distribution engine includes a transaction engine:
    to perform secure off-line negotiation of prices for media contents to be bought and sold;
    to perform secure off-line sending and receiving of purchase requests for media contents;
    to perform secure off-line sending and receiving of transaction receipts for media contents bought and sold; and
    to perform secure off-line acknowledgement of received receipts;
    wherein a buyer possessing a receipt for an off-line purchase of the media content can immediately download the media content from the seller or from a service provider, and a seller possessing an acknowledgment of a receipt received by the buyer can immediately be credited with the second percentage of the sale price.

21. A method, comprising:
    authenticating a buyer by a seller using a buyer's public key;
    facilitating the buyer to authenticate the seller using a seller's public key;
    checking whether the buyer has a valid account with a service provider;
    negotiating freely a price via an off-line sales transaction for securely transferring a digital media content from a seller's media player to a buyer's media player, wherein the off-line sales transaction comprises:
        receiving a cryptographically secure purchase request from the buyer;
        verifying the cryptographically secure purchase request using the buyer's public key;
        sending a cryptographically secure transaction receipt to the buyer who verifies the cryptographically secure transaction receipt using the seller's public key; and
        receiving a receipt acknowledgement from the buyer, wherein the receiving completes the sales transaction;
    securely storing a proof of the off-line sales transaction between the buyer and the seller in both of the seller's media player and the buyer's media player, wherein the second user can enjoy the digital media content off-line without limitations and without paying the price right after the off-line sales transaction, and the authenticating, the facilitating, the checking, the negotiating, and the securely storing are done off-line without connecting to an internet or a communication link outside a seller and a buyer; and providing the proof stored in either the seller's media player or the buyer's media player to the service provider when either the seller or the buyer is online, so that a first percentage of the price is provided to an owner of a copyright of the digital media content, and a second percentage of the price is provided to the seller, wherein what is provided to the seller is always less than the price, and the service provider acts as a clearinghouse for monetary accounts of the seller, the buyer, and the owner of the copyright of the digital media content, and credits or debits each account accordingly.

22. The method as recited in claim 21, further comprising optimizing the price via market probing of multiple of the off-line transactions.

* * * * *